(12) United States Patent
Lawandy et al.

(10) Patent No.: US 6,531,262 B1
(45) Date of Patent: *Mar. 11, 2003

(54) METHODS AND APPARATUS FOR RENDERING AN OPTICALLY ENCODED MEDIUM UNREADABLE AND TAMPER-RESISTANT

(75) Inventors: Nabil M. Lawandy, North Kingstown, RI (US); Charles M. Zepp, Hardwick, MA (US); Andrei Smuk, Providence, RI (US); Marianne Krieg-Kowald, Barrington, RI (US)

(73) Assignee: SpectraDisc Corporation, Providence, RI (US)

( * ) Notice: Subject to any disclaimer, the term of this patent is extended or adjusted under 35 U.S.C. 154(b) by 16 days.

This patent is subject to a terminal disclaimer.

(21) Appl. No.: 09/690,405

(22) Filed: Oct. 17, 2000

Related U.S. Application Data

(63) Continuation-in-part of application No. 09/338,959, filed on Jun. 24, 1999, now Pat. No. 6,338,933.
(60) Provisional application No. 60/090,682, filed on Jun. 25, 1998, provisional application No. 60/160,437, filed on Oct. 19, 1999, provisional application No. 60/183,248, filed on Feb. 17, 2000, provisional application No. 60/185,912, filed on Feb. 29, 2000, provisional application No. 60/186,006, filed on Mar. 1, 2000, provisional application No. 60/189,592, filed on Mar. 15, 2000, provisional application No. 60/218,449, filed on Jul. 14, 2000, provisional application No. 60/226,514, filed on Aug. 21, 2000, provisional application No. 60/230,462, filed on Sep. 6, 2000, and provisional application No. 60/231,254, filed on Sep. 8, 2000.

(51) Int. Cl.[7] .............................................. G11B 3/70
(52) U.S. Cl. ................... 430/270.15; 430/945; 283/81; 283/86; 369/283; 369/286; 369/275.1
(58) Field of Search ................ 283/81, 86; 430/270.15, 430/270.1, 945; 369/286, 283, 275.1

(56) References Cited

U.S. PATENT DOCUMENTS 4,237,211 A   12/1980   Fanselow .................... 430/19

(List continued on next page.)

FOREIGN PATENT DOCUMENTS

DE   3720233   12/1988

(List continued on next page.)

OTHER PUBLICATIONS

Abstract of "Little bang and big vibrations to stop a CD thief (CD ROM security)", D.I. George, Proceedings of the 17th international online information meeting, London, UK pp. 593–598 (1993).*

(List continued on next page.)

Primary Examiner—Martin Angebranndt
(74) Attorney, Agent, or Firm—Harrington & Smith, LLP

(57) ABSTRACT

Methods and apparatus are provided for making an optically readable media unreadable and tamper-resistant. A method has steps of (a) providing the media with a readout surface layer that is non-flat (i.e., textured in some way, such as by embossing, scratching, depositing a non-planar layer or regions, such as droplets) and that inhibits optical readout of the media; (b) applying a coating layer to the non-flat surface layer to smooth the non-flat surface and to enable optical readout of the media; and, after an initiation of a readout period, (c) removing the coating layer so as to expose the non-flat readout surface layer, thereby inhibiting optical readout of the media. Preferably, the coating layer is substantially index matched to the readout surface layer. The step of removing includes at least one of evaporating or subliming a component material of the coating layer A method is also disclosed for discouraging tampering with a readout-limiting mechanism by (a) providing the media with at least one layer that embodies the readout-limiting mechanism; (b) providing a textured surface that forms part of a layer that underlies the at least one layer, where the textured surface inhibits optical readout of the media; and (c) applying a coating layer over the textured surface to smooth the textured surface and to enable optical readout of the media, wherein removal of the coating layer exposes the textured surface thereby inhibiting optical readout of the media.

47 Claims, 18 Drawing Sheets

U.S. PATENT DOCUMENTS

| | | | |
|---|---|---|---|
| 4,380,769 A | | 4/1983 | Thomas et al. ......... 430/270.15 |
| 4,478,768 A | | 10/1984 | Takeoka et al. ............. 264/1.4 |
| 4,527,173 A | | 7/1985 | Gupta et al. ................. 430/945 |
| 4,542,288 A | | 9/1985 | Drexler ....................... 235/487 |
| 4,578,690 A | | 3/1986 | Veillette et al. ............. 346/212 |
| 4,584,641 A | | 4/1986 | Guglielmino ................... 380/5 |
| 4,677,604 A | | 6/1987 | Selby, III et al. ............. 369/33 |
| 4,720,826 A | * | 1/1988 | Sugiyama et al. ........... 369/283 |
| 4,734,796 A | | 3/1988 | Grynberg et al. ............. 371/42 |
| 4,735,839 A | | 4/1988 | Sato et al. ............. 430/270.19 |
| 4,748,316 A | * | 5/1988 | Dickson ....................... 235/454 |
| 4,785,361 A | | 11/1988 | Brotby .......................... 380/3 |
| 4,849,836 A | | 7/1989 | Kachikian .................... 369/32 |
| 4,865,942 A | | 9/1989 | Gottschalk et al. ......... 430/138 |
| 4,866,769 A | | 9/1989 | Karp ............................. 380/4 |
| 4,879,704 A | | 11/1989 | Takagi et al. ................. 369/84 |
| 4,933,377 A | | 6/1990 | Saeva et al. ............. 430/280.1 |
| 4,975,898 A | | 12/1990 | Yoshida ........................ 360/60 |
| 4,980,782 A | | 12/1990 | Ginkel .......................... 380/4 |
| 5,028,109 A | | 7/1991 | Lawandy ................. 350/96.12 |
| 5,050,213 A | | 9/1991 | Shear ............................. 380/4 |
| 5,053,339 A | | 10/1991 | Patel ............................. 436/2 |
| 5,162,989 A | | 11/1992 | Matsuda ......................... 705/1 |
| 5,183,763 A | | 2/1993 | Mallow et al. ............. 436/106 |
| 5,185,233 A | | 2/1993 | Santo .......................... 430/945 |
| 5,267,311 A | | 11/1993 | Bakhoum ................ 369/275.4 |
| 5,293,422 A | | 3/1994 | Loiacono ....................... 380/3 |
| 5,311,494 A | | 5/1994 | Sugita et al. ................. 369/100 |
| 5,322,747 A | | 6/1994 | Hugle ......................... 380/25 |
| 5,336,531 A | * | 8/1994 | Nakayama et al. ......... 427/510 |
| 5,346,654 A | | 9/1994 | Kodaka et al. ............. 264/1.33 |
| 5,370,970 A | | 12/1994 | Tanaka et al. ............. 430/945 |
| 5,371,792 A | | 12/1994 | Asai et al. .................... 360/60 |
| 5,373,499 A | | 12/1994 | Inaino et al. ............... 369/100 |
| 5,384,221 A | | 1/1995 | Savant et al. ................. 430/19 |
| 5,400,319 A | | 3/1995 | Fite et al. ................. 369/275.5 |
| 5,412,718 A | | 5/1995 | Narasimhalu et al .......... 430/1 |
| 5,418,852 A | | 5/1995 | Itami et al. .................... 369/14 |
| 5,426,625 A | | 6/1995 | Bui et al. ................. 369/44.32 |
| 5,432,647 A | | 7/1995 | Tateishi .......................... 380/4 |
| 5,448,551 A | | 9/1995 | Miyagawa et al. ......... 369/271 |
| 5,453,968 A | | 9/1995 | Veldhuis et al. .............. 360/60 |
| 5,461,239 A | | 10/1995 | Atherton ..................... 250/566 |
| 5,473,584 A | | 12/1995 | Oshima ........................ 360/60 |
| 5,510,163 A | | 4/1996 | Sullivan et al. ............ 428/64.1 |
| 5,513,169 A | | 4/1996 | Fite et al. .................... 369/272 |
| 5,513,260 A | | 4/1996 | Ryan ............................. 380/4 |
| 5,538,773 A | | 7/1996 | Kondo ..................... 428/164.1 |
| 5,570,379 A | | 10/1996 | Sasaki et al. .................. 360/60 |
| 5,572,589 A | | 11/1996 | Waters et al. ................... 380/4 |
| 5,574,787 A | | 11/1996 | Ryan ............................. 380/4 |
| 5,582,434 A | * | 12/1996 | Skov et al. .................... 283/81 |
| 5,587,984 A | | 12/1996 | Owa et al. ................... 369/103 |
| 5,592,454 A | | 1/1997 | Tobita et al. ................. 369/58 |
| 5,598,399 A | | 1/1997 | Ogihara et al. .......... 369/275.2 |
| 5,608,717 A | | 3/1997 | Ito et al. ................... 369/275.3 |
| 5,629,914 A | | 5/1997 | Clark et al. ................... 369/59 |
| 5,636,096 A | | 6/1997 | Mardirossian ............... 360/133 |
| 5,636,292 A | | 6/1997 | Rhoads ....................... 382/232 |
| 5,644,566 A | | 7/1997 | Nakayama et al. ...... 369/275.2 |
| 5,646,920 A | | 7/1997 | Raczynski .................... 369/47 |
| 5,661,703 A | | 8/1997 | Moribe et al. ................. 369/14 |
| 5,671,202 A | | 9/1997 | Brownstein et al. .......... 369/58 |
| 5,680,383 A | | 10/1997 | Clark et al. .................... 369/59 |
| 5,681,633 A | | 10/1997 | Onagi et al. ............... 428/64.3 |
| 5,776,573 A | * | 7/1998 | Trotter et al. .......... 430/270.11 |
| 5,815,484 A | * | 9/1998 | Smith et al. ............. 369/275.1 |
| 5,846,836 A | | 12/1998 | Mallow ..................... 436/169 |
| 5,935,673 A | * | 8/1999 | Mueller ..................... 428/64.1 |
| 5,963,536 A | | 10/1999 | Vasic et al. .............. 369/275.4 |
| 6,011,772 A | | 1/2000 | Rollhaus et al. ............ 369/286 |
| 6,038,207 A | | 3/2000 | Wachi ..................... 369/275.4 |
| 6,083,667 A | | 7/2000 | Nishizawa et al. ......... 430/321 |
| 6,087,075 A | | 7/2000 | Kler et al. ................... 430/321 |
| 6,338,933 B1 | * | 1/2002 | Lawandy et al. ........ 430/270.1 |

FOREIGN PATENT DOCUMENTS

| | | | |
|---|---|---|---|
| EP | 0524242 | | 12/1994 |
| GB | 2290526 | * | 1/1996 |
| JP | 1-211285 | | 8/1989 |
| JP | 401252902 A | | 10/1989 |
| JP | 02-018728 | | 1/1990 |
| JP | 4-128834 | | 4/1992 |
| JP | 4-318342 | | 4/1992 |
| JP | 05-297627 | | 11/1993 ................ 430/19 |
| JP | 6-082952 | | 3/1994 |
| JP | 09-011619 | | 1/1997 |
| JP | 411053767 A | | 2/1999 |
| WO | WO 98/11539 | | 3/1998 |

OTHER PUBLICATIONS

Gaston, C.A., "Software Copy Protection by Controlled Damage", IBM Tech. Discl. Bull, vol. 27(8) pp. 4788 (Jan. 1985).*

Sands, J.L., "CD–ROPM Destruction (Intentional !)", CD–ROM Professional, pp. 58–59 (Mar. 1991).*

Tarkka, R.M., et al., "Holographic Storage in a Near–IR Sensitive Photochromic Dye", Opt. Commun. vol. 109, pp. 54–58 (Jun. 1994).*

Matsuoka, Masaru, Ed., Infrared Absorbing Dyes, Plenum Press, pp. 71–88 & 117–140 (chapters 7 and 10) (1990).*

Gradient force: The mechanism for surface relief grating formation in azobenzene functionalized polymers by Kumar et al in Applied Physics Letters, vol. 72, No. 17, Apr. 27, 1998; pp. 2096–2098.

Working Knowledge, Compact–Disc Player, by K. Pohlmann, Scientific American 9/98 PP109.

International Search Report, Patent Cooperation Treaty. International Application No. PCT/US00/41231. Dated Apr. 5, 2001.

* cited by examiner

TEXTURED SURFACE

METHODS AND APPARATUS FOR RENDERING AN OPTICALLY ENCODED MEDIUM UNREADABLE AND TAMPER-RESISTANT

CLAIM OF PRIORITY FROM COPENDING PROVISIONAL PATENT APPLICATIONS

This patent application claims priority under 35 U.S.C. §119(e) from copending Provisional Patent Application No. 60/160,437, filed Oct. 19, 1999; from copending Provisional Patent Application No. 60/183,248, filed Feb. 17, 2000; from copending Provisional Patent Application No. 60/185,912, filed Feb. 29, 2000; from copending Provisional Patent Application No. 60/186,006, filed Mar. 01, 2000; from copending Provisional Patent Application No. 60/189,592, filed Mar. 15, 2000; from copending Provisional Patent Application No. 60/218,449, filed Jul. 14, 2000; from copending Provisional Patent Application No. 60/226,514, filed Aug. 21, 2000; from copending Provisional Patent Application No. 60/230,461, filed Sep. 06, 2000; and from copending Provisional Patent Application No. 60/231,254, filed Sep. 08, 2000, the disclosures of which are incorporated by reference herein in their entireties.

CROSS-REFERENCE TO A RELATED U.S. PATENT APPLICATION

This patent application claims priority under 35 U.S.C. §120 as a continuation-in-part of copending U.S. patent application Ser. No. 09/338,959, filed on Jun. 24, 1999 now U.S. Pat. No. 6,338,933, the disclosure of which is incorporated by reference herein in its entirety, said U.S. Patent Application claiming priority under 35 U.S.C. §119(e) from Provisional Patent Application No. 60/090,682, filed Jun. 25, 1998, the disclosure of which is incorporated by reference herein in its entirety.

FIELD OF THE INVENTION

This invention relates to optically readable data storage media and, more particularly, to techniques to render said media unreadable after being read at least once.

BACKGROUND OF THE INVENTION

It is often desirable when distributing software or other information, such as music and films, that is recorded on a medium to insure that only one party is enabled to access the recorded information. For example, a company that sells computer software will find it advantageous to enable only the purchaser to read the software from a disk and transfer or install the software to computer memory, such as a hard disk, while preventing subsequent access by other parties to the software.

It would also be advantageous when renting content on an optical media, such as a DVD or a CD, to provide only a limited amount of time during which the content can be viewed or otherwise accessed, and to then prohibit further viewing or access (referred to herein as a limited-play mechanism). In this manner the person renting the media need not return the media, as after the limited amount of time expires the media becomes unusable.

Successful readout of an optical disk by all current disk readers heavily relies on a number of parameters that characterize the readout laser beam on its path from the laser to the reflective data layer of the disk and back to the optical pickup system of the reader. The electromagnetic wave structure of the readout beam is described by intensity, phase, polarization, and wave vectors of the wave components that constitute the readout beam. The wave structure of the beam determines geometrical and propagation parameters of the beam, such as beam size, angle of incidence, and angle of convergence.

In addition to reading the data layer of a disk, the reader performs other functions, which are as critical for playability as the data readout itself. These functions include auto-focusing, auto-tracking and error correction. The first two functions allow the reader device to actively control motion of the laser head and spindle motor in order to maintain the required position of the beam relative to the disk. Therefore, maintaining the integrity of the wave structure of the beam throughout its path inside the disk material is a key not only to the successful detection and decoding of the information carried by the beam, but also for the continuity of the readout process.

U.S. Pat. No. 5,815,484 discloses an optical disk having a reflective metallic layer with a plurality of data structures (provided in the form of pits and lands) and a reactive compound superimposed over at least some of the data structures. The reactive compound is a photochromic compound which changes from an optically transparent condition to an optically opaque condition when subjected to readout light and/or atmospheric oxygen. When the compound becomes opaque it prevents readout light from being detected by the readout apparatus, thereby effectively rendering the optical disk unreadable.

A significant perceived disadvantage of this approach is that manufacturing, processing and storage of the disks would require an oxygen-free environment. In addition, the coating materials should be degassed to an oxygen-free state and maintained in this condition.

Another disadvantage is that most of the chemical moieties described have poor light fastness, which would allow a limited play disk to be photobleached and converted to a permanent play disk.

Furthermore, in some cases it may be possible to remove a layer of the photochromic compound, thereby defeating the purpose of providing same on the media.

In general, the unauthorized removal of a layer on the media in an attempt to defeat the limited-play mechanism, and thus extend the useful life of the media, is undesirable.

Reference may also be had to commonly assigned U.S. Pat. No. : 6,011,772 for disclosing the use of a barrier layer, the removal of which initiates the action of a reading-inhibit agent to prevent machine reading of information encoding features on an optical disk. The reading-inhibit agent may also be activated by exposure to optical radiation, or by rotation of the disk.

OBJECTS OF THE INVENTION

It is a first object and advantage of this invention to provide an improved system and method to render an optically readable media, such as, but not limited to, a laser disk, a compact disk (CD), or a digital video disk (DVD), unreadable.

It is a second object and advantage of this invention to provide an improved system and method to render an optically readable media permanently unreadable, after having been read at least once.

It is a third object and advantage of this invention to provide an improved system and method to prevent or discourage tampering with a layer intended to limit the useful life of the optically readable media.

It is still another object and advantage of this invention to provide a mechanism that relies on evaporation of a substance for modifying the optical properties of an optically readable media so as to render the media optically unreadable.

It is still another object and advantage of this invention to provide a mechanism that relies on sublimation of a substance for modifying the optical properties of an optically readable media so as to render the media optically unreadable.

It is another object and advantage of this invention to provide a technique that increases optical scattering from a surface or layer of an optically readable media so as to render the media optically unreadable, and/or to defeat an attempt to remove a limited-play mechanism of the media.

It is another object and advantage of this invention to provide a mechanism that alters a surface characteristic of an optically readable media so as to detrimentally affect a readout apparatus tracking process during an attempted readout of the media.

It is a further object and advantage of this invention to provide a mechanism that causes surface topography changes to an optically readable media so as to detrimentally affect a readout apparatus feedback and tracking process, thereby adversely affecting the fidelity of the readout.

SUMMARY OF THE INVENTION

The foregoing and other problems are overcome and the objects and the advantages of the invention are realized by methods and apparatus in accordance with embodiments of this invention.

A method is disclosed for making an optically readable media unreadable, as is a media that operates in accordance with the method. The method has steps of (a) providing the media with a readout surface layer that is non-flat (i.e., textured in some way, such as by embossing, scratching, depositing a non-planar layer or regions, such as droplets) and that inhibits optical readout of the media; (b) applying a coating layer to the non-flat surface layer to smooth the non-flat surface and to enable optical readout of the media; and, after an initiation of a readout period, (c) reducing a thickness of the coating layer so as to expose the non-flat readout surface layer, thereby inhibiting optical readout of the media. Preferably, the coating layer is substantially index matched to the readout surface layer. In one embodiment the step of reducing the thickness includes a step of evaporation or sublimation of at least one component material of the coating layer.

Further in accordance with these teachings a method is disclosed for discouraging tampering with a readout-limiting mechanism of an optically readable media, as is a media that is constructed so as to operate in accordance with the method. In this embodiment the method has steps of: (a) providing the media with at least one layer that embodies the readout-limiting mechanism; (b) providing a textured surface that forms part of a layer that underlies the at least one layer, where the textured surface inhibits optical readout of the media; and (c) applying at least one coating layer over the textured surface to smooth the textured surface and to enable optical readout of the media, wherein removal of the coating layer exposes the textured surface thereby inhibiting optical readout of the media. The readout-limiting mechanism can include a layer that changes from an optically transparent state to a state that inhibits successful readout of data structures located on the media or, more generally, a layer that changes from a first state that enables successful readout of data structures located on the media to a second state that inhibits successful readout of data structures located on the media. The readout-limiting mechanism can function as well as one of the coating layers.

The above-mentioned change to the second state from the first state can be induced by an increase in optical absorption and/or by an increase or a change in mechanical stress in a layer or layers, and/or by an increase in optical scattering, and/or by evaporation of a volatile compound, and/or by sublimation of a volatile compound. A volatile compound or material as employed herein is one that is capable of supporting or participating in a material transport driven by a concentration gradient between the material and a surrounding medium, examples of which are evaporation and sublimation. Stated differently, a volatile compound or material is one that is capable of losing mass through a transport mechanism to a surrounding medium.

In a further embodiment of this invention an optically readable media is constructed to include a surface region that encodes information that is optically readable by a reading device and a transparent readout surface layer that contains localized regions each containing a volatile compound having an index of refraction at the readout light wavelength that is closely matched to the material of the surrounding readout surface layer. The localized regions are responsive to an initiation of a readout period for losing at least some of the volatile compound, such as by evaporation or sublimation, for creating voids within the transparent readout surface layer. The presence of the voids increases the optical scattering and thereby inhibits optical readout of the media.

It should be noted that in the embodiments that employ surface roughness or voids, that the optical transmission through the layer can be essentially unchanged.

In various ones of the embodiments of this invention a barrier layer can be provided to protect and to inhibit or regulate the loss of the volatile substance to the surrounding medium, effectively isolating a layer containing the volatile substance from the surrounding medium. The barrier layer could be provided as a peel-off layer for isolating the volatile substance from the surrounding medium at least until it is desired to use the media in the readout device. The media can be packaged in a sealed container, such as a plastic bag, that contains a source of the volatile compound, thereby inhibiting loss of the volatile compound from the media until the media is removed from the container and exposed to the surrounding medium.

The limited play disk is preferably packaged in a sealed container with a source of an agent that inhibits transport of a volatile species from the color forming layer or from a layer that sublimates, wherein the onset of the limited play period coincides with the opening of the container.

It should be understood that the foregoing and other various aspects of the teachings of this invention may be implemented alone or in combination to achieve the purposes set forth herein.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
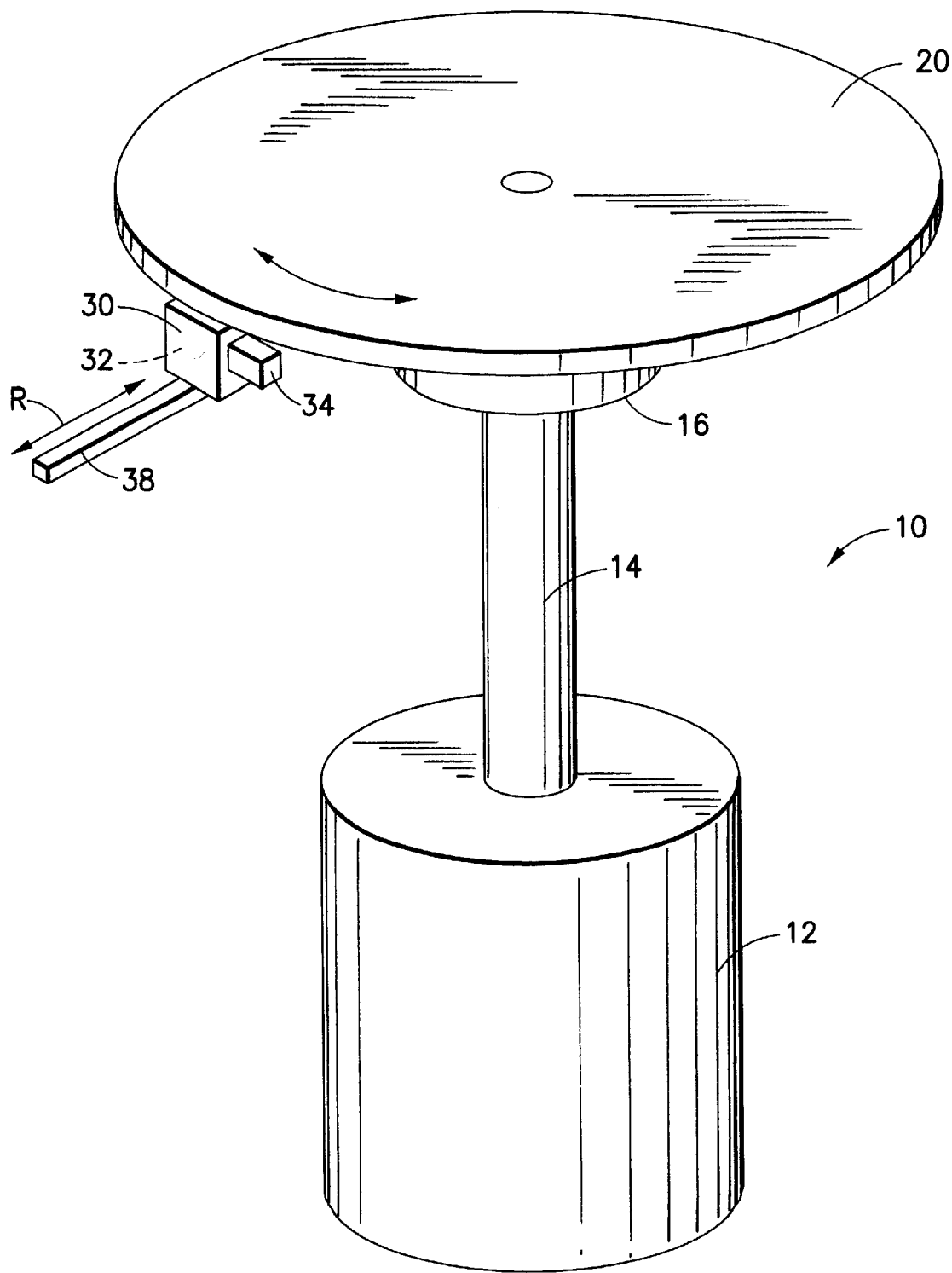
FIG. 1 is a schematic diagram of a conventional optical scanning system for reading an optically readable disk that incorporates one or more aspects of this invention.

Referring now to FIG. 1, there is shown a schematic diagram of an optical scanning system 1 for reading an optically readable disk that incorporates one or more features of the present invention. Although the present invention will be described with reference to the embodiments shown in the drawings, it should be understood that the present invention may be embodied in many forms of alternative embodiments. In addition, any suitable size, shape or type of materials or elements could be used.

It should further be noted at the outset that as employed herein an "optically encoded" or "optically readable" media or medium is intended to cover a number of various devices wherein data (such as a computer program), audio (such as music) and/or video (such as a film), collectively referred to herein simply as information or content, is stored such that it can be readout when a lightbeam (either visible light or invisible light) is applied to the medium. Such a medium can include, but is not limited to, laser disks, compact disks (CDs), CD-ROMs, and digital video or versatile disks (DVDs), as well as certain kinds of tape.

In general, the media of interest to this invention incorporates some type of mechanism that is capable of altering an optical property of the light, for example, the wavefront, optical noise content, intensity and/or wave emission wavelength. Also, the reflectance and/or transmission property of the media can be changed.

By rendering the media "unreadable" it should be understood that it is not necessary to make the entire media unreadable. For example, it may be necessary to make only a relatively small portion of a boot record or a directory of contents unreadable such that the entire media becomes unusable or unreadable, or such that some predetermined portion of the media becomes unusable or unreadable. Making the media unreadable may also imply adversely affecting a readout device optical feedback and tracking process. By example, readout laser focus adjustments may not be able to react quickly enough to a modified surface profile of the media, resulting in an inability to maintain the correct tracking. This has been found to manifest itself as "skipping" through a music segment of a compact disk, or to otherwise negatively impact the fidelity of the output.

The optical scanning system 1, which may be conventional in construction, generally comprises a disk drive 10 and an optical scanning head 30. The disk drive 10 is generally adapted to move an optically readable disk 20, such as a CD-ROM, relative to the optical scanning head 30. In the embodiment shown in FIG. 1, the optical scanning head 30 is located below the optical disk 20 for scanning a lower surface of the disk, though in other embodiments the scanning head may located to scan an upper surface of the disk. The scanning head 30 is preferably held by a movable carriage or arm (not shown) so that the head 30 may be moved relative to a center of the disk. For example, the scanning head may be able to translate radially relative to the center of the disk 20 or circumferentially around the center of the disk. In alternate embodiments, the optical scanning head may be fixedly held relative to the center of the optically readable disk. As the disk 20 moves over the scanning head 30, the head reads optically readable data structures 23 (see FIG. 2) disposed on the disk 20. Referring still to FIG. 1, the disk drive 10 includes a motor 12, a drive shaft 14 and a disk support or chuck 16. The drive shaft 14 operably connects the motor 12 to the chuck 16. Thus, when energized the motor 12 rotates the chuck 16 through the drive shaft 14. The chuck 16 comprises appropriate holding means (not shown) to stably hold the disk 20 thereon when the chuck 16 is rotated by the motor 12. The motor 12 is adapted to rotate the chuck 16 and the disk 20 held thereon at predetermined speeds. The motor 12 may operate to rotate the disk 20 at a variable rotational velocity so that the disk presents a reading surface to the scanning head 30 which moves at a constant linear velocity. For example, as the scanning head 30 is radially translated closer to the center of the disk 20 on the chuck 16, the motor 12 spins the disk 20 at an increasing rotational velocity. Thus, the portion of the disk 20 passing over the scanning head 30 is moving at a constant linear velocity. It is noted that in conventional laser disks, the data structure is generally disposed in a single track spiralling from the edge of the disk towards the center which requires that the disk spin at a variable rate of rotation in order for the track to move at a constant linear speed relative to the scanning head. By way of example, the disk drive 10 may rotate a DVD at an appropriately increasing rate of rotation to provide a linear velocity of about 3.5 m/sec over the scanning head 30.

Figure 2:
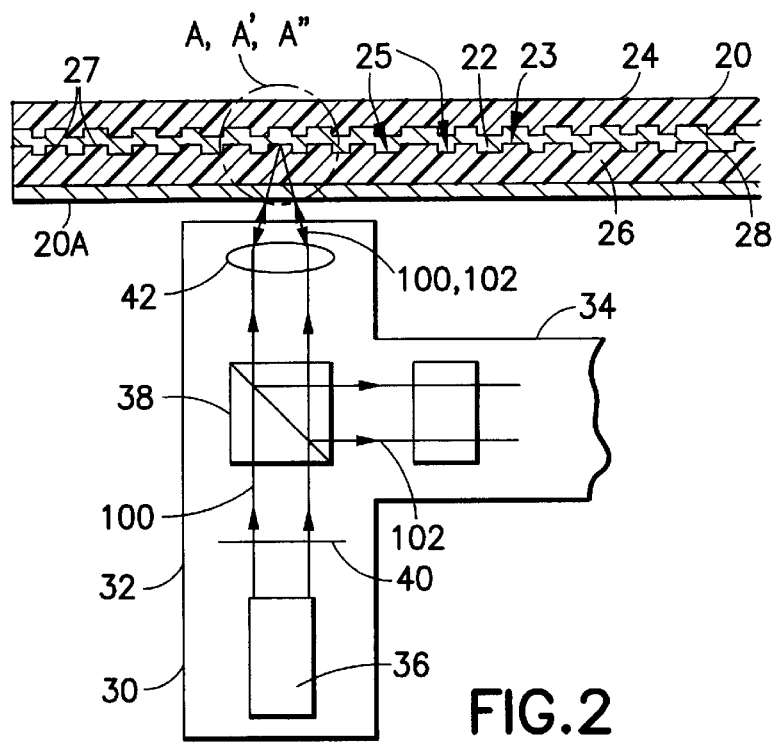
FIG. 2 is a schematic side elevation and partial cross-sectional view of an optical scanning head of the optical scanning system scanning the optically readable disk of FIG. 1.

Referring now to FIG. 2, the scanning head 30 generally includes a light source 32 and a photodetector 34. The light source 32 generates and directs an incident or interrogating beam 100 of electromagnetic radiation (also referred to herein as optical radiation) against the optical disk 20. The optical disk 20 includes a reflective layer 22 with data structures 23 formed thereon or therein. The interrogating beam 100 of electromagnetic radiation directed against the optical disk 20 is reflected by the reflecting layer 22 as a reflected beam 102. The reflected beam 102 is then detected by then photodetector 34 of the optical scanning head 30. When the disk drive 10 rotates the disk 20 relative to the scanning head 30, the interrogating beam 100 passes over the data structures 23 on the reflective layer 22 of the disk. As the interrogating beam 100 moves over the data structures 23, the data structures modulate the reflected beam 102. The modulation in the reflected beam 102 is registered at the photodetector 34 of the scanning head 30 and converted to electrical signals.

More particularly, and by way of example, the light source 32 may include a laser diode 36 or other such suitable device for generating the interrogating beam 100 of optical radiation. The beam 100 generated by the laser diode 36 may be directed through a quarter wave plate 40 and through polarizing beam splitter 38 as shown in FIG. 2. Alternatively, the positions of the wave plate and beam splitter may be reversed so that the beam passes first through the beam splitter and then through the wave plate. Also, the beam generated by the laser diode 36 may be collimated by a collimator (not shown) before encountering the wave plate 40. After the interrogating beam 100 passes through the beam splitter 38, the beam encounters an appropriate lens 42 which focuses the interrogating beam 100 at a predetermined focal point. The interrogating beam 100 emitted by the light source 30 may have a wavelength of about 650 nm, although the beam may have other wavelengths. The interrogating beam 100 may be focused to a spot size of approximately 0.63 $\mu$m. The depth of focus of the beam 100 is about 0.9 $\mu$m, though this depth may be adjusted as required. The interrogating beam 100 is modulated by an appropriate modulator (such as an acousto-optic or electro-optic modulator, not shown) to effect a residence time per bit of between about 100–200 nsec. The laser diode 36 is otherwise adapted to deliver approximately 1 mW of power on the optical disk 20. The energy deposited per bit by the interrogating beam 100 is about 200 pJ and the fluence of the beam on the focus spot is about 50 mJ/cm$^2$. Therefore, the intensity of the interrogating beam 100 on the focus spot is about 300 kW/cm$^2$. In alternate embodiments, the light source may have any other suitable configuration to generate an interrogating beam of electromagnetic radiation having appropriate characteristics for reading data structures from an optical disk.

Still referring to FIG. 2, the reflective layer 22 of the laser disk 20 is disposed between an upper protective layer 24 and a lower layer 26. The reflective layer 22 may be comprised of metal, such as aluminum, though other suitable materials may be used, which is formed by appropriate means to provide a reflecting surface 28 to the interrogating beam 100. As mentioned previously, the reflective surface 28 of layer 22 is encoded with information stored as data structures 23. The data structures 23 are adapted to change the reflected beam 102 when the interrogating beam 100 is incident on features of the data structures 23. For example, the data structures 23 may comprise a pattern of lands 25 and pits 27 formed in the reflective surface 28 of the optical disk 20. The lands 25 are raised portions on the reflective surface 28 of the optical disk. The pits 27 are depressed portions (relative to the lands 25) in the reflective surface 28 of the optical disk 20. For example, the individual pits 27 may have a width of about 0.4 um and a length of between about 0.4–1.9 um, though the pits may have any other suitable length and width. In alternate embodiments, the data structures formed in the reflective surface of the optical disk may have any other suitable features which change a quality of the reflected beam when the interrogating beam encounters these features. By way of example such features may be sequences of scarified and reflective surfaces or through holes in the reflective surface of the optical disk.

As is shown in FIG. 2, the interrogating beam 100 generated by the light source 32 is focused by the lens 42 such that the focal point is located at the 'bottom' surface of the pits 27 in the reflective surface 28 of the optical disk 20. When the interrogating beam 100 is incident on the surface of a pit 27, the interrogating beam 100 is reflected by the pit surface as a reflected beam 102. The reflected beam 102 passes through the lens 42 (now acting as a collimator for the reflected beam) and is then deflected by the beam splitter 38 to strike the photodetector 34 in the scanning head 30. When the interrogating beam 100 is instead directed at a land 25 of the reflective surface 28, a lesser amount of the beam 100 is reflected back to be detected by the photodetector 34. This is because the surface of the land 25 is located at a different depth then the focal depth of the interrogating beam 100.

Alternatively, the interrogating beam 100 generated by the light source may be focused by the lens at the surface of the lands 25 and not the pits 27.

In either case, it can be appreciated that the change in reflectivity between two states (corresponding to whether the interrogating beam 100 is incident on a pit 27 or on a land 25), provides a mechanism to encode binary data (i.e., ones and zeroes) into the surface of the disk.

The preferred embodiments of the present invention will be described hereafter assuming that the interrogating beam 100 is focused at the surface of the pits 27 in the reflective surface 28 of the optical disk 20, though the teachings of this invention are equally applicable to the case where the interrogating beam is instead focused at the surface of the lands 25.

Still referring to FIG. 2, the optical disk 20 is constructed so as to include a layer or coating 20A of a reactive compound that evaporates over time. In the preferred embodiments the coating 20A includes a dye, such as a lactone dye, having a cation with strong light absorbance properties around 650 nm, a currently preferred wavelength for the readout laser. A polymer material or some other material can be used to provide an acidic environment for causing a controlled ring opening of the lactone dye, and which can be cross-linked or otherwise modified to form a relatively inert or inactive coating layer.

Lactone dyes are generally colorless so long as the lactone moiety remains intact. However, by modifying the environment, for example by lowering the pH and/or by changing the micropolarity, the lactone ring is cleaved and the intensely colored cationic form of the dye is obtained.

Figure 3:
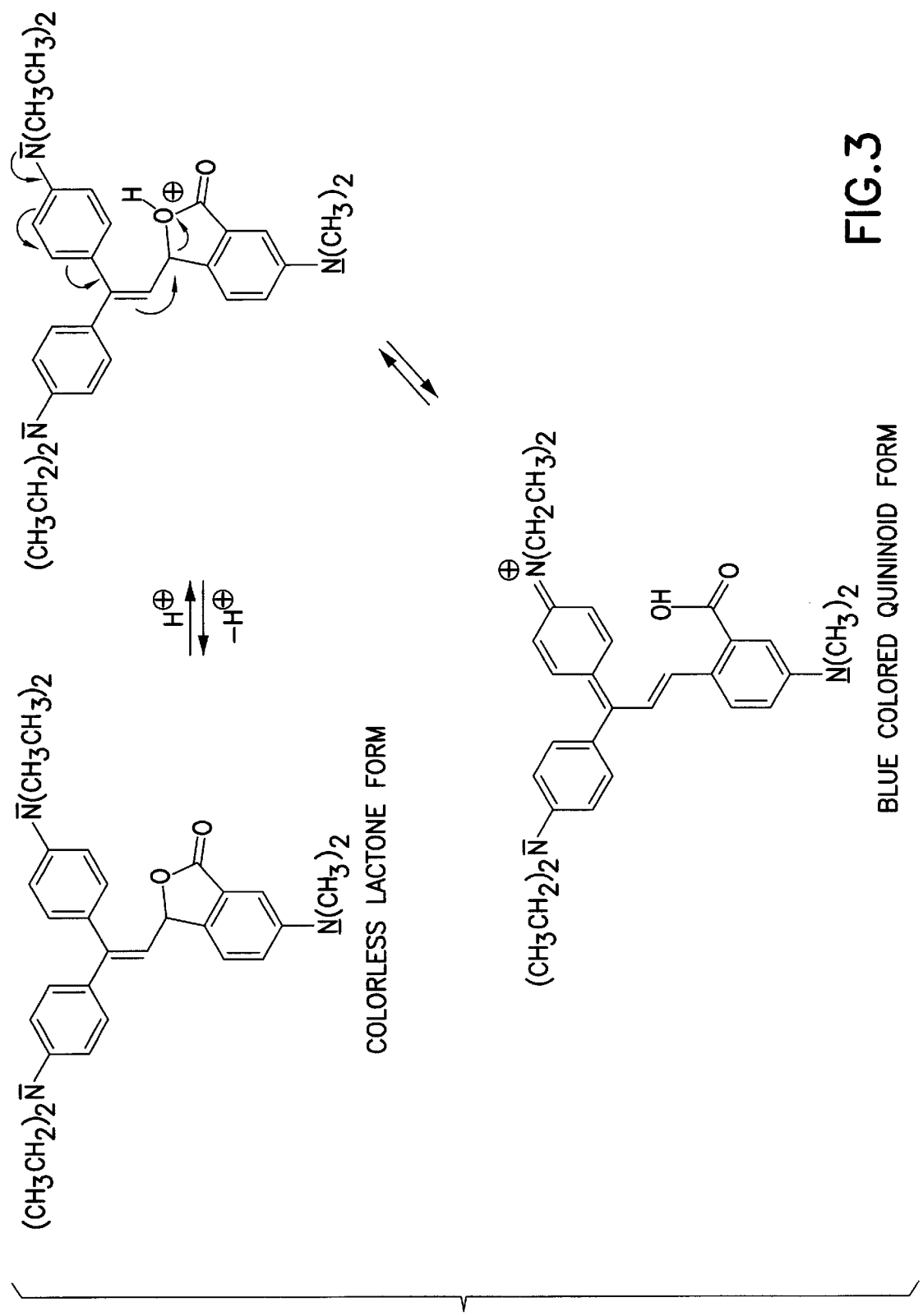
FIG. 3 illustrates a colorless lactone form and its cationic (colored) form, and is useful in explaining an embodiment of this invention that employs an evaporative technique for rendering an optically readable media unreadable.

Referring now also to FIG. 3, the color-forming coating 20A includes at least three components: (1) a dye, such as a lactone type dye; (2) acidic sites; and (3) a solvent, such as an amine or amide-based solvent. The acidic sites may be provided by a polymer, a clay, or by any other acidic substrate. When the components are combined, the amine or amide-based solvent serves to stabilize the lactone dye to the colorless form. When the amide or amine-based solvent evaporates, the lactone group reacts with the acidic sites and undergoes a ring opening to generate a highly colored substance with a strong absorption at the wavelength currently used to read DVD and CD disks (i.e., about 650 nm).

In greater detail, the colorless lactone shown in the reaction scheme shown in FIG. 3 is protonated by an acid. Each nitrogen is shown with its free electron pair. The protonated lactone undergoes a ring opening to produce the colored compound, in this case, blue, which is in a quininoid form. The electron pairs on the two nitrogens with the ethyl groups are directly involved with the ring opening of the protonated lactone, thereby producing the colored compound in a quininoid form.

The functioning of this color changing system is based on a four component equilibrium. The equilibrium is between the colorless lactone form, the colored quininoid form, and the number of acidic and basic sites associated with the permanent and the volatile components of the color changing system.

In general, the rate of color change is dependent on the type of solvent and its boiling point. By selecting an appropriate solvent, complete color formation can occur within a range of a few minutes to several hours to even longer times (days). Moreover, the final maximum absorbance at the readout wavelength can be modified over a range of absorbances by changing the lactone moiety to acidic site ratio.

In other embodiments of this invention the polymer provides a basic environment while the evaporating solvent has an acidic nature. In this case the color change occurs when the system transitions from acidic to basic due to evaporation.

The "undyed" state of the disk may be maintained by storing the disk in a way that prevents the solvent from evaporating, described in further detail below.

Figure 4:
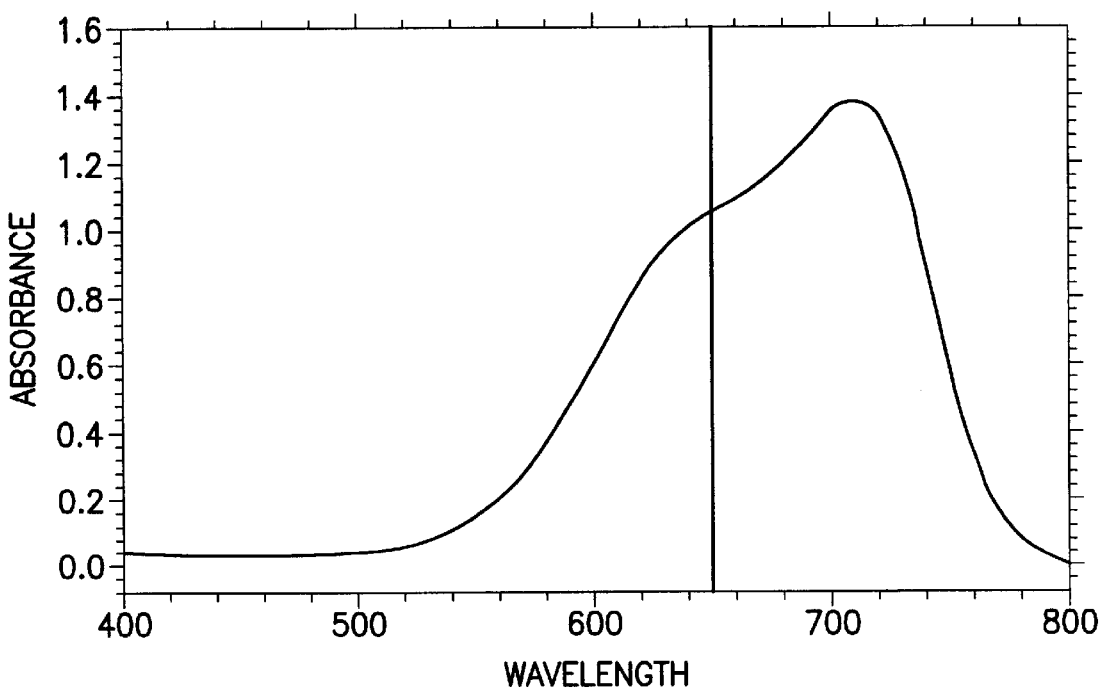
FIG. 4 is a graph that illustrates a change in optical absorption as a function of wavelength for an embodiment of a color changing compound (an amino-phthalide dye (SD-3055) in a 4-vinylphenol polymer) in accordance with an aspect of this invention.

Further in accordance with an embodiment of these teachings an amino-phthalide dye in a 4-vinylphenol polymer (av. MW 8,000) was cross-linked in the presence of formaldehyde. FIG. 4 shows the optical absorbance of this system when coated on a glass plate, and exposed to normal room conditions for 21 hours. The vertical bar represents the absorbance at 650 nm. In other embodiments the crosslinking may be controlled in incremental steps, as the level of cross-linking was found to effect the lactone ring opening. It may further be desirable to employ a phenolformaldehyde resin system with the formaldehyde functionality already chemically linked to the polymer, in order to avoid the use of free formaldehyde. Analogues may also be synthesized with solubility properties tailored to the polymer formulations.

In any of these embodiments the coating 20A may be applied by a spin coating procedure. As an example, for the amino-phthalide dye in the 4-vinylphenol polymer embodiment a layer thickness equal to or less than about one micrometer was found to be optimum, and DVD readability was found to be disabled when the absorbance at 650 nm was equal to or greater than about 0.5.

EXAMPLE 1

A solution was prepared of 1 g poly(4-vinylphenol) (MW=8,000) in 10 ml ethanol, 2 ml N,N-dirnethylformamide and 200 mg of 3-[2,2-bis(4-diethylarninophenyl)vinyl)-6-dimethylaminophthalide. Glass slides, DVD and CD disks were coated with this formulation to produce a 500–700 nm thick layer. The coating was dried at 60–70 degrees C for a few minutes, which caused the generation of an intensely blue colored dye. This blue dye was transformed back to its colorless state by exposing the slides or disks to a controlled atmosphere of an amine or amide based solvent (e.g., fonnamides, acetamides, pyrrolidinones). The colorless state was maintained when these slides and disks remained sealed in polyester or polypropylene bags along with an absorbent medium, such as filter paper, that contained a few drops of the corresponding solvent. Upon removal from the bag, color formation occurred again. Depending on the boiling point of the used solvent, the color formation could be timed. For example, with the formulation described in this example, and by using 1-methyl-2-pyrrolidinone as a solvent, a maximum absorbance of 0.7 at 650 nm was achieved after about six hours at room temperature.

EXAMPLE 2

Modification of the polymer to lactone ratio was found to control the maximum achievable absorbance at 650 nm. It is important not to just increase the concentration of lactone groups, but to also adjust the number of acidic sites available to the lactone moiety. When glass slides and disks were coated with a formulation of 1.5 g poly(4-vinylphenol) (MW=8,000), 10 ml ethanol, 2 ml N,N-dimethylformamide and 300 mg of 3-[2,2-bis(4-diethylarninophenyl)vinyl)-6-dimethylaminophthalide, a maximum absorbance of 1.7 at 650 nm was obtained after about six hours at room temperature.

EXAMPLE 3

If high boiling amine or amide-based solvents are used; e.g., b.p.>100° C., the solvent can be added directly to the formulation and exposure of the coating to a controlled solvent atmosphere can be omitted. For example, when slides or disks were coated with a formulation of 1 g poly(4-vinylphenol) (MW=8000), 10 ml ethanol, 2 ml 1-methyl-2-pyrrolidinone and 200 mg of 3-[2,2-bis(4-diethylaminophenyl)vinyl]-6-dimethylaminophthalide, and then dried for 5 minutes at 50° C., a slightly tacky colorless layer was obtained. The color change to blue occurred at the same rate and to the same level of absorbance as described in Example 1 of this embodiment.

A further aspect of these teachings is a mechanism to control the process by which the color change occurs, and hence the duration of the readable state of the optical media.

Figure 14:
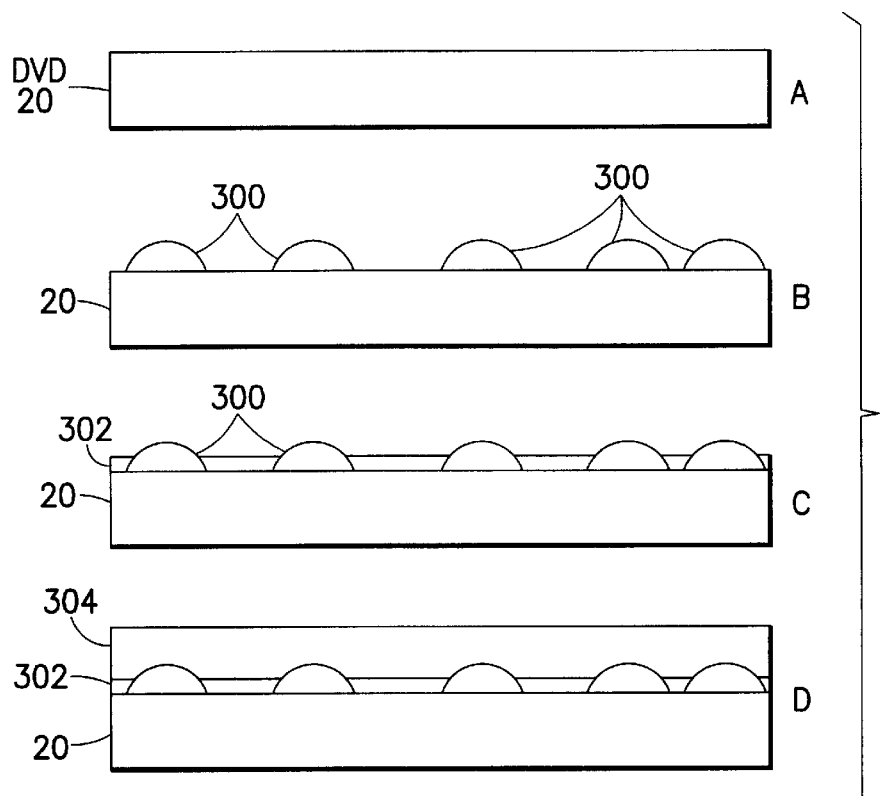
FIG. 14 depicts a cross-sectional view of a disk during several fabrication steps in accordance with an embodiment of these teachings.
Figure 15:
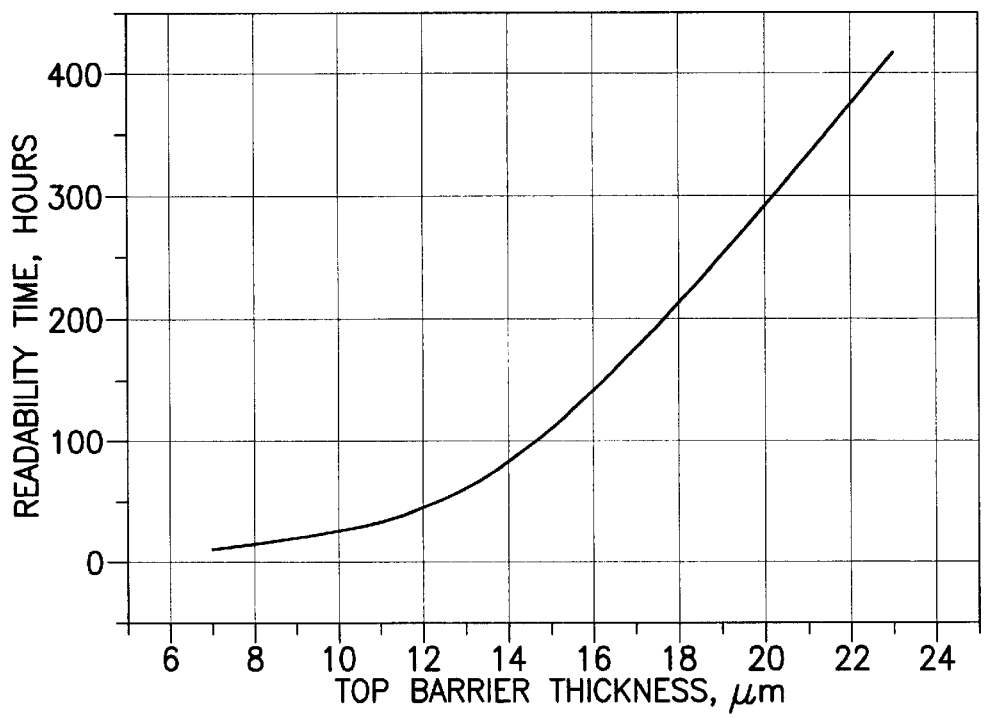
FIG. 15 is a graph that plots disk readability time versus top barrier layer thickness.

Referring to FIG. 15, a graph is depicted that plots media readability time (in hours) versus a thickness of a top barrier layer 304(see FIG. 14) that is placed over the color-forming layer 302. An increase in the thickness of the top barrier layer can be seen to increase the amount of time that the media remains in the readable state, as transport of the volatile substance (e.g., the evaporating solvent) through the barrier layer 302 is slowed. The thickness of the barrier layer can also be used to control the readability time of the embodiments, described below, that employ sublimation.

As a further control over the time that the media remains in the playable state, and referring also to FIG., 13, the color-changing layer 302 can be biased with a chromophore selected to absorb at the desired wavelength, e.g., at about 650 nm. By causing the layer 302 to exhibit some amount of absorption that is less than the maximum amount of absorption that is tolerated before the media become unreadable (the readability threshold), the time required for the media to decrease the transmission of the layer 302 to the readability threshold, due to the evaporative mechanism, is reduced. The use of the bias chromophore can also be advantageous to insure that the transmission of the color changing layer 302 will not asymptotically approach the readability threshold, without actually crossing it. It should be noted that the readability threshold may vary from reader to reader due to differences in laser output, detector sensitivity, and other factors. The use of the biasing chromophore can thus be advantageous to insure that all media will become unreadable in all readers within approximately the same amount of time.

One suitable biasing chromophore for a disk 20 used with a reader employing a 650 nm readout wavelength is a dye known as 3-Diethylamino-7-diethyliminophenoxazonium perchlorate, or Oxazine 725, which has an absorbance maximum at 646 nm in ethanol.

As a further aspect of this invention, composite and multi-player (multi-wavelength) coatings can be employed as an additional feature. Such multi-wavelength coatings provide absorption maxima at two or more wavelengths that coincide with possible readout light wavelengths, e.g., 630 nm and 780 nm for CDs, 630 nm and 650 nm for DVDs, and to also accommodate future higher density readout wavelengths at 440 nm. The multi-wavelength coating can also be used to absorb a specific wavelength and a range of wavelengths, such as 635 nm and the range of 750 nm to 800 nm.

As a further aspect of this invention, texturing of a surface layer of the disk 20 can be employed to defeat an attempt to chemically or otherwise remove the readout wavelength absorbing coating., weaken its adhesion to the disk 20, or otherwise tamper with it. A goal of this aspect of the invention is to make a removal of the color forming polymer result in a non-flat (textured) read-out surface of the disk, rendering it permanently unreadable. This mechanism preferably relies on an introduction of optical noise beyond the correction limit of the disk readout device, or beyond an ability of the tracking mechanism to compensate, or on a combination of both.

Figure 5:
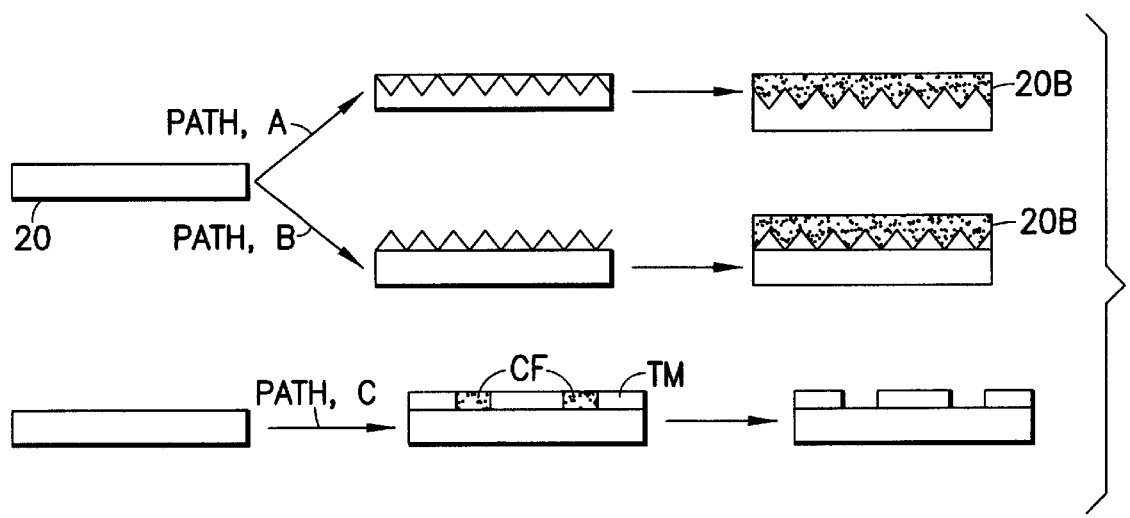
FIG. 5 shows implementations of protection mechanisms against chemical tampering or coating removal.

This aspect of the invention may be implemented using several approaches. One approach is to produce a surface texture on the read-out side of a disk by patterning the original disk material as shown in FIG. 5 on path A. This can be accomplished by, as examples only, embossing, engraving or scratching the original disk material. Another method of producing a textured surface is to unevenly deposit, such as by spraying, a chemically resistant, strongly adherent and optically transparent material on the original surface, as shown on path B, making the disk unreadable (see FIG. 14). A next step applies one or several additional coatings 20B over the textured (non-flat) surface, one of which may be the color-forming coating and another of which may be a protective coating (see FIG. 14). It is desired to match or substantially match the index of refraction of the coating to the underlying textured (non-flat) surface of the layer so as to produce a smooth playable surface. Any or all of the layers 20B applied above the textured surface may have texture smoothing functionality (e.g., filling the "valleys" of the underlying texture to a degree acceptable for playability). The color forming coating may fill or partially fill the underlying surface defects and/or textures to render the optical disk readable. If the color forming coating only partially fills the underlying surface defects and/or textures, then the protective coating layer or layers fill the remainder Referring to FIG. 14, in one presently preferred embodiment processing begins with the disk 20, such as one coming from the conventional disk production line (14A). In step 14B the readout surface is textured by depositing an optically clear, chemically resistant material. This forms textures or structures 300. In the preferred embodiment this step sprays an optical adhesive (Norland NOA73) onto the disk surface, and then UV cures the adhesive. The end result is the formation of the three dimensional features or structures 300 having a diameter of about 200 micrometers and a height of about 250 nm. At the end of this step the disk 20 is unreadable. In step 14C the color forming coating 302 is applied to provide the limited play function as well as to smooth the surface texture. Preferably the coating 302 is applied by spin-coating a layer comprised of the lactone dye/solvent system described above. As is shown, the thickness of the color forming coating 302 may be less than the height of structures 300 (e.g., less than about 250 nm), although in other embodiments the thickness of the color forming layer 302 may equal or exceed the height of the structures 300. For example, the thickness of the color forming coating 302 can be about 800 nm. The color forming coating 302 may include the biasing chromophore discussed above in reference to FIG. 13. It is also within the scope of this invention to include one or more taggants within the color forming coating 302 (and/or within another layer), such as preselected phosphors that emit predetermined wavelengths when illuminated by excitation light. The taggants enable the disk 20 or at least the color forming coating 302 to be subsequently identified as to place of origin, or to identify a manufacturing batch, etc. Preferably the selected taggant(s) do not interfere with the normal readout process to any significant degree. In step 14D the barrier coating 304 is applied to protect the color forming coating 302 and to control the material loss rate from the color forming coating, as was discussed above with reference to FIG. 15. Preferably the barrier coating 304 is also applied by spin-coating, and is comprised of a UV-curable polymer that includes a UV-A compound to absorb incident UV light. The thickness of the barrier coating 304 can be in the range of about 7 micrometers to about 25 micrometers, although thinner or thicker film thicknesses can be used. After being applied the barrier coating layer 304 is UV cured.

Preferably, the readability degrades until the disk 20 becomes unreadable due to the color forming coating 302 turning opaque, substantially opaque, or until it simply blocks a sufficient amount of light so that the disk 20 is no longer readable.

In this regard it should be noted that it is not necessary in this embodiment, or in any of the other embodiments of this invention that employ the color forming coating, for the coating to be become optically opaque, as the disk 20 may become unreadable or unplayable well before a state or condition of optical opacity is reached.

Further in accordance with these teachings, dissolving or otherwise removing part or all of the color forming coating 302 exposes the three dimensional structures 300 of the textured surface, with the result being that the disk 20 remains or becomes unreadable.

Another aspect of this invention is to produce a single composite coating as shown in FIG. 5 along path C. In this aspect, parts of the read-out surface of a disk surface are coated with the color forming (CF) material and the remainder of the surface area is coated with a chemically resistant transparent material (TM). Dissolving the color forming portion of the composite coating leaves the disk surface textured and therefore renders the disk permanently unreadable.

As was stated above, the successful readout of an optical disk 20 by current disk readers heavily relies on a number of parameters that characterize the readout laser beam on its path from the laser to the reflective data layer of the disk and back to the optical pickup system of the reader. The electromagnetic wave structure of the readout beam is described by intensity, phase, polarization, temporal pattern and wave vectors of the wave components that constitute the readout beam. The wave structure of the beam determines geometrical and propagation parameters of the beam, such as beam size, angle of incidence, and angle of convergence.

If the integrity of the readout beam is compromised by optically inhomogeneous or non-uniform disk material, in accordance with an aspect of these teachings, the playability of the disk 20 can be impeded due to failure in any of the three beam functions: data readout (error correction), autofocusing, and auto-tracking.

In accordance with this aspect of these teachings a limited-play mechanism for the optical disk 20 is based on a transformation of a reactive surface layer of the readout side of a disk, which results in modification of the surface parameters of the layer, such as flatness and roughness. The transformation can be induced by physical and/or chemical processes. Physical processes include evaporation or sublimation of a coating substance, as well as material loss resulting in a change in a concentration gradient of a component initially present in the layer. The component can be lost into the surrounding medium by means of, by example, diffusion and desorption. Chemical processes include chemical reactions induced by light, by loss of a component initially present in the layer, or by absorption of a component from the surrounding medium.

One specific case of such a transformation of the surface layer results in a bending or warping of the disk 20 (flatness of the surface is adversely affected), which renders the disk 20 unreadable. This can be implemented, for example, by coating the disk 20 with two different layers, at least one of which is reactive, with the different layers having non-matching expansion coefficients or elastic constants. The transformation in this case results in disk warp (e.g., a "bimetallic plate" effect). Another specific case of the transformation of the surface layer results in surface topography formation (surface corrugation, optical roughness of the surface is affected), which renders the disk 20 unreadable. This can be implemented, for example, by coating the disk 20 with a reactive layer in which the transformation induces elastic stress in excess of the tensile strength of the layer material. This results in multiple ruptures and fragmentation of the coating layer and, therefore, a significant optical roughness of the surface, which makes the disk 20 unreadable due at least to increased scattering of the readout light without significantly changing the transmission of the coating.

Another embodiment of these teachings involves surface topography formation due to evaporation of a solvent, which non-uniformly modifies the surface tension of the layer material, resulting in increased surface roughness (Marangoni effect) and increased optical scattering.

In these embodiments an increase or change in mechanical stress in at least one layer results in the disk 20 becoming optically unreadable.

One example of a reactive compound suitable for such an application is a chemical moiety that undergoes cis-trans isomerization, such as modified azo-benzene, when exposed to spatially non-uniform light (radiance), such as that developed in the readout beam. The transformation of this compound from the trans to the cis configuration is accompanied by a volume change which, in the geometry of a layered coating, results in a generation of elastic stress.

In accordance with an embodiment of the invention, a method for rendering the optical disk 20 unreadable includes the steps of: a) providing the optical disk 20 with at least one layer which undergoes surface deformation in the presence of a stimulus, such as a transport of a volatile constituent compound to the surrounding medium, as can be caused by evaporation or sublimation of the constituent compound; and b) selectively removing the volatile constituent compound from the layer to the surrounding medium for inducing a deformation in a surface of the layer. The surface deformation thus induced during the play process, or more generally during the period during which successful readout of the disk 20 is possible, causes an aberration in the beam, which may prevent focusing of the beam at desired locations on the features of the data structures 23 during readout. This results in a general failure to readout the data on the disk 20 during the readout process.

Figure 6:
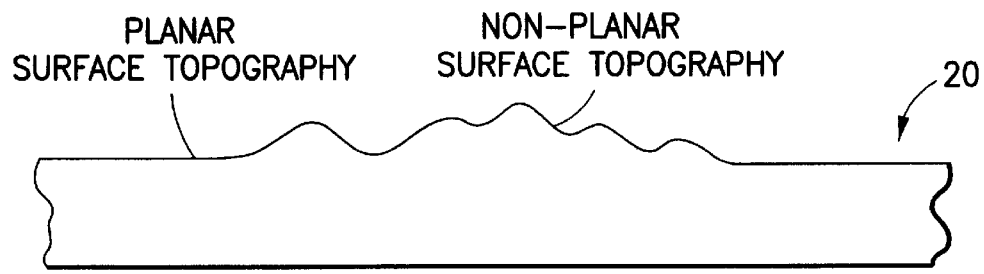
FIG. 6 is an enlarged cross-sectional view of a portion of an optically readable media having a surface topography that is modified from a planar profile, and which can be used to detrimentally affect the tracking operation of the readout device in accordance with the teachings of this invention.

FIG. 6 is an enlarged cross-sectional view of a portion of an optically readable media 20 having a surface topography that is modified from a planar profile, and which can be used to detrimentally affect the tracking operation of the readout device further in accordance with the teachings of this invention. In this embodiment the planar surface topography is modified to the non-planar (or non-flat) surface topography (not shown to scale) by the use of a photoresponsive polymer, or through one of an evaporative technique or a sublimation technique, or by providing a surface layer that interacts with a substance in the atmosphere, such as oxygen, water vapor, or carbon dioxide. In these cases it is not necessary to modify the transparency of the surface layer to the readout beam, such as by increasing its radiation absorbing properties through a color change. Instead, the varying surface topography, and its deviation from the expected planar surface layer topography, is sufficient to detrimentally affect the operation of the readout device, such as the tracking operation.

Figures 7, 7A:
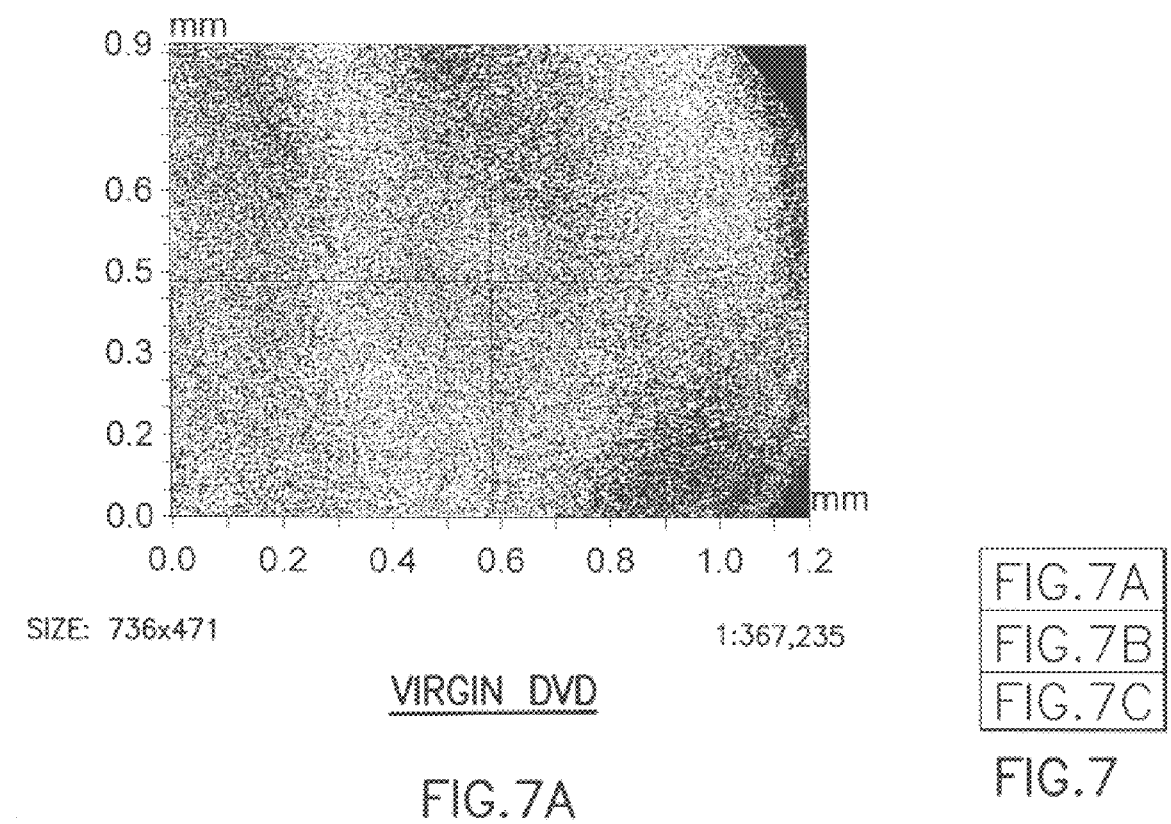
FIG. 7 shows a two dimensional profile of a virgin disk.
Figure 7B:
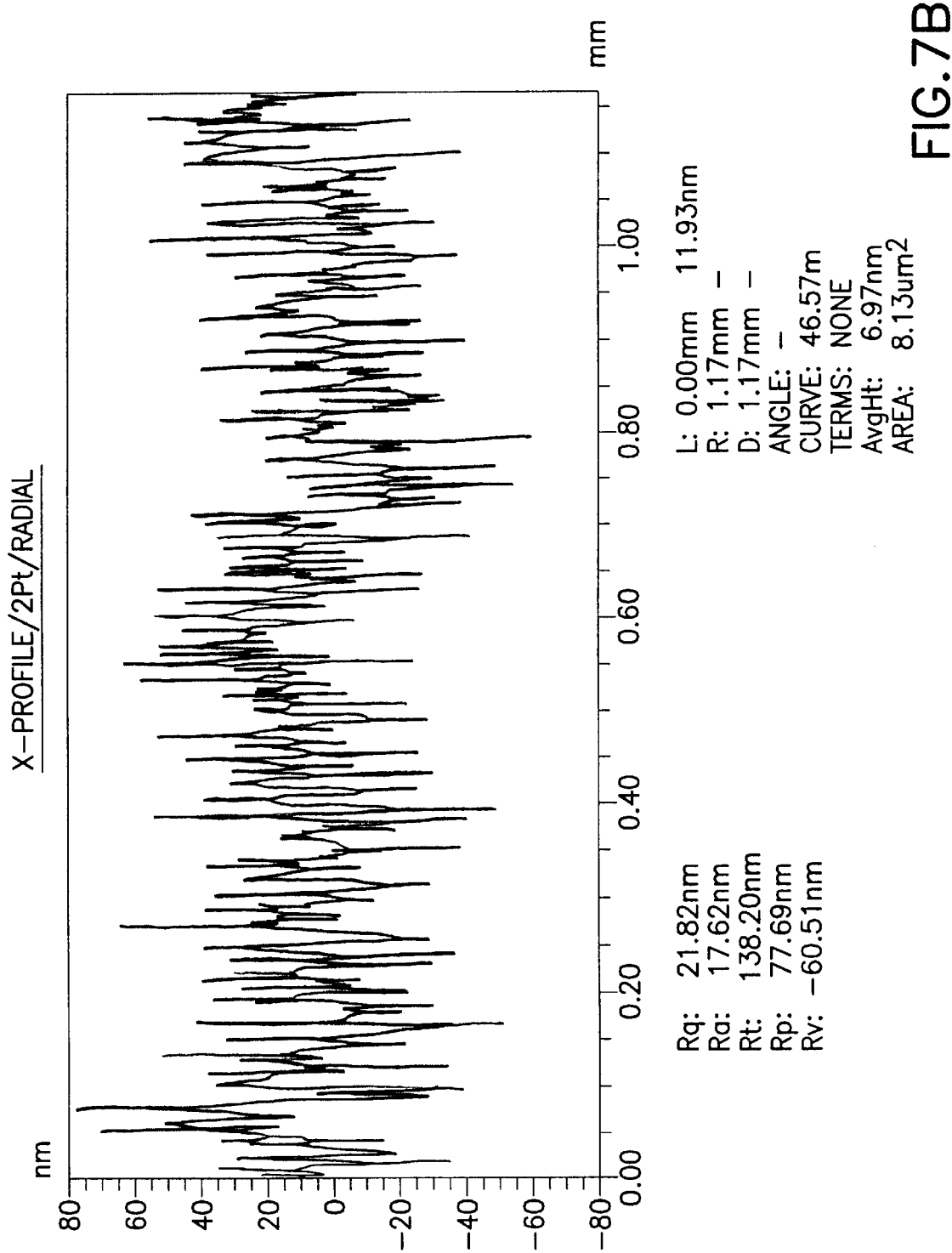
Figure 7C:
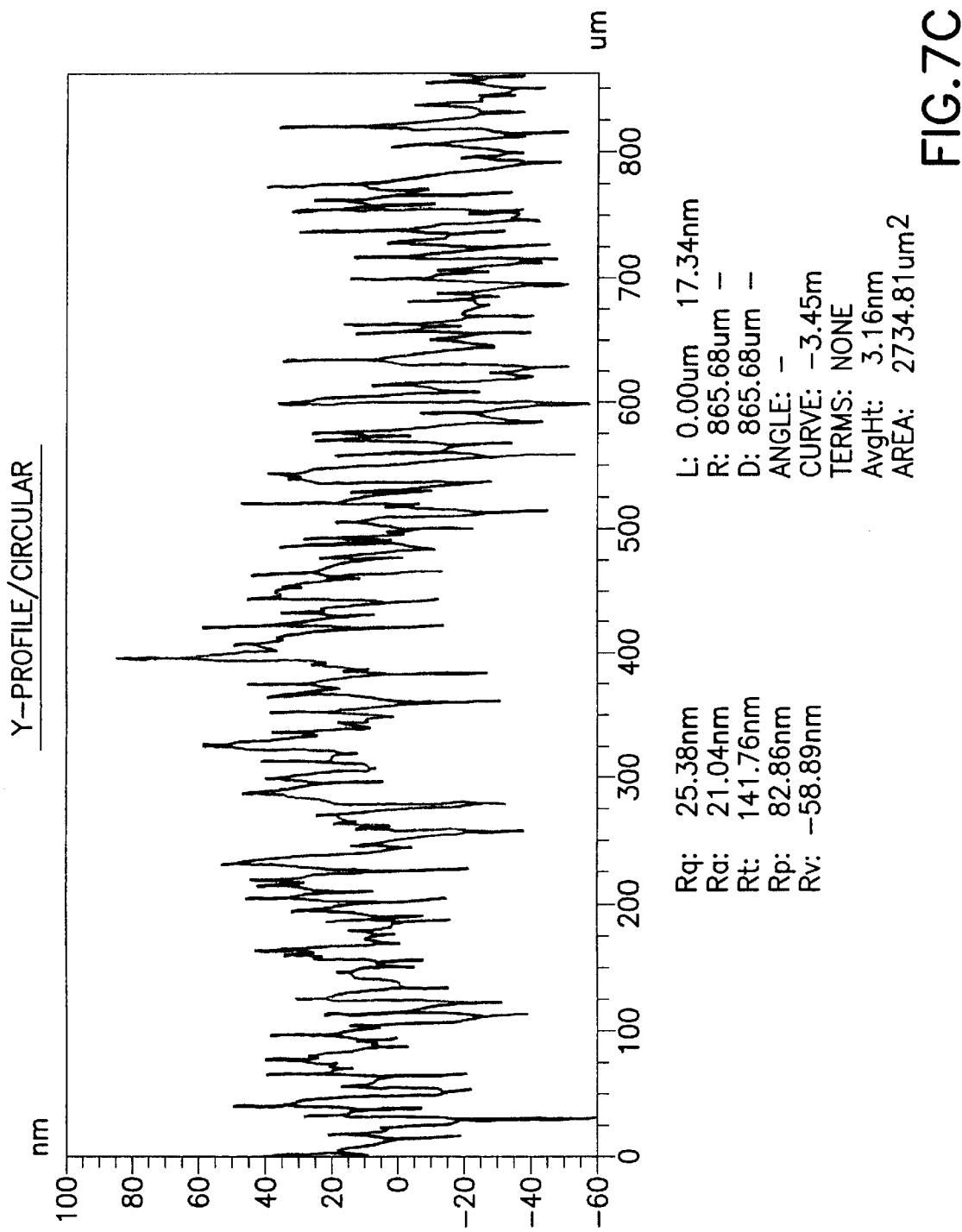
Figures 8, 8A:
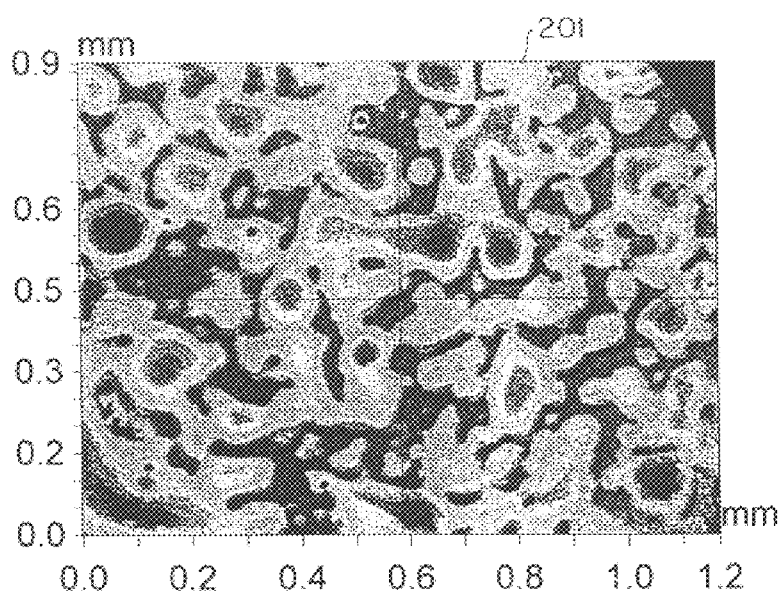
FIG. 8 shows a two dimensional profile of a disk with a surface texture.
Figure 8B:
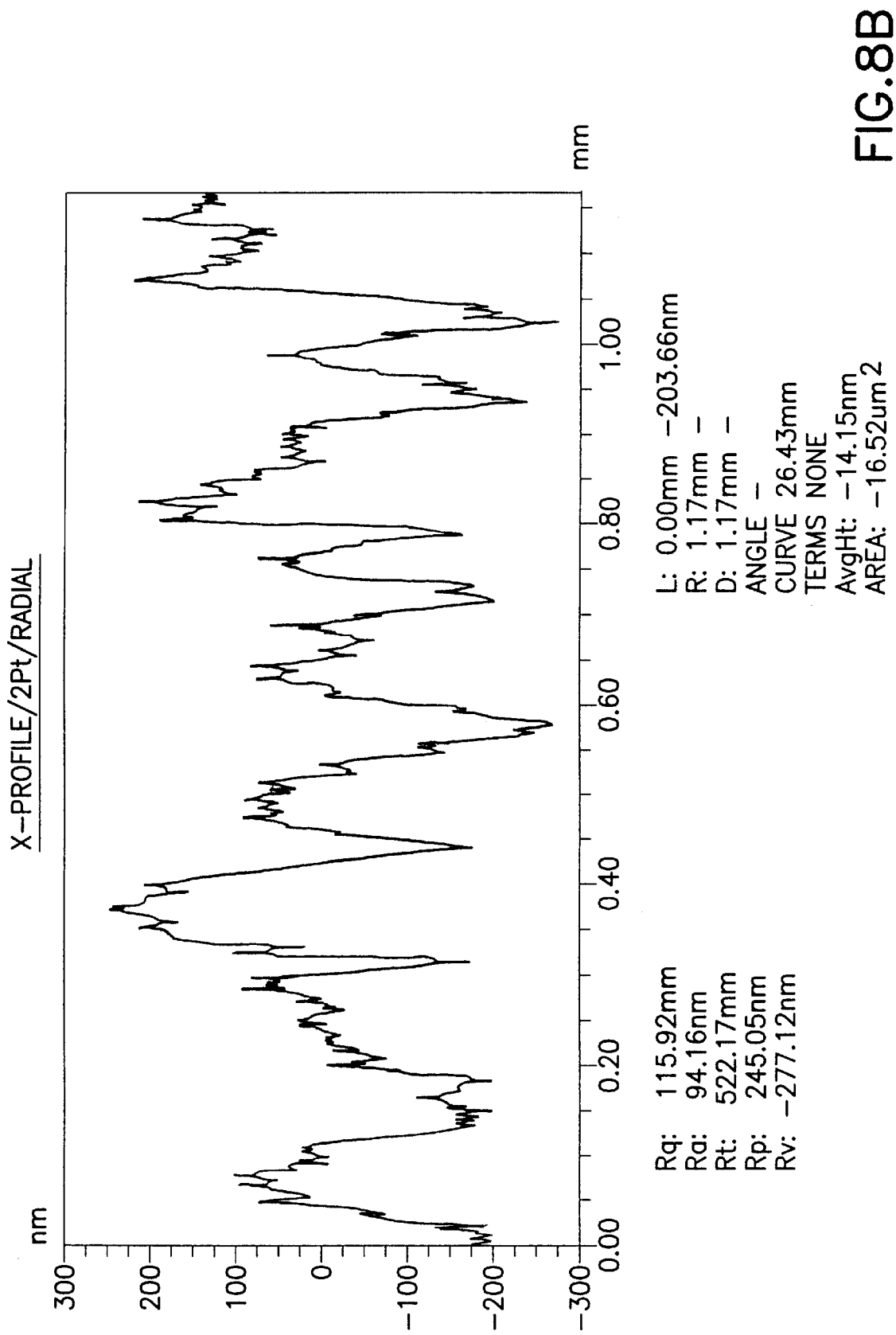
Figure 8C:
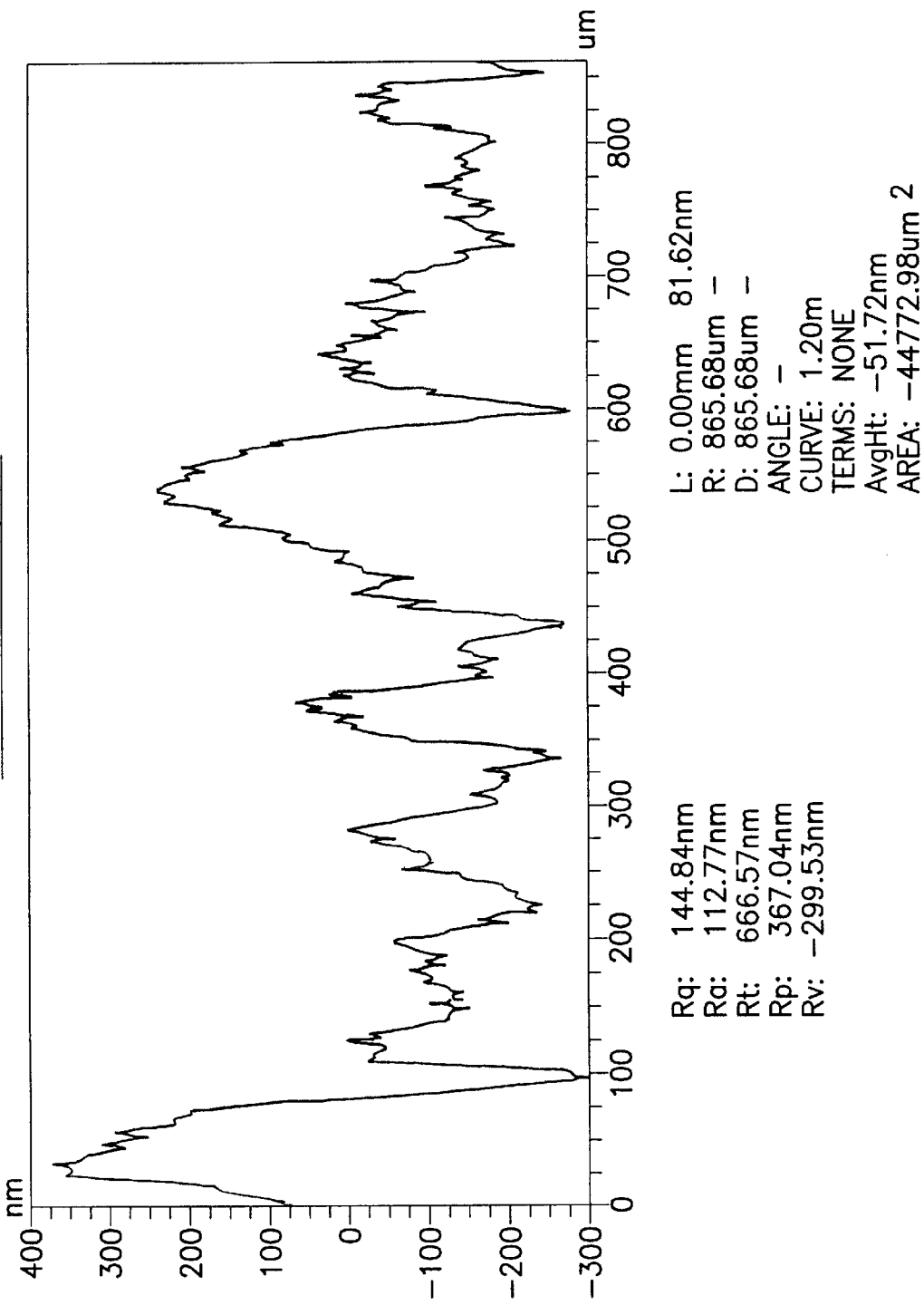
Figure 9A:
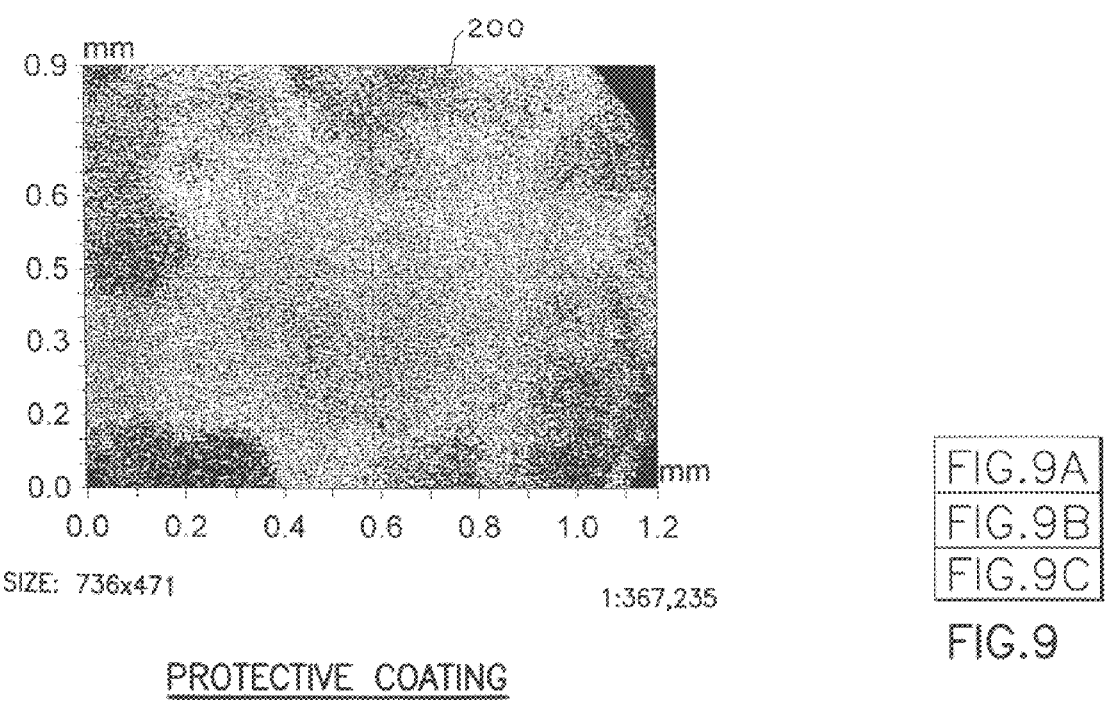
FIG. 9 shows a two dimensional profile of a disk with a surface texture and a protective (smoothing) coating over the surface texture.
Figure 9B:
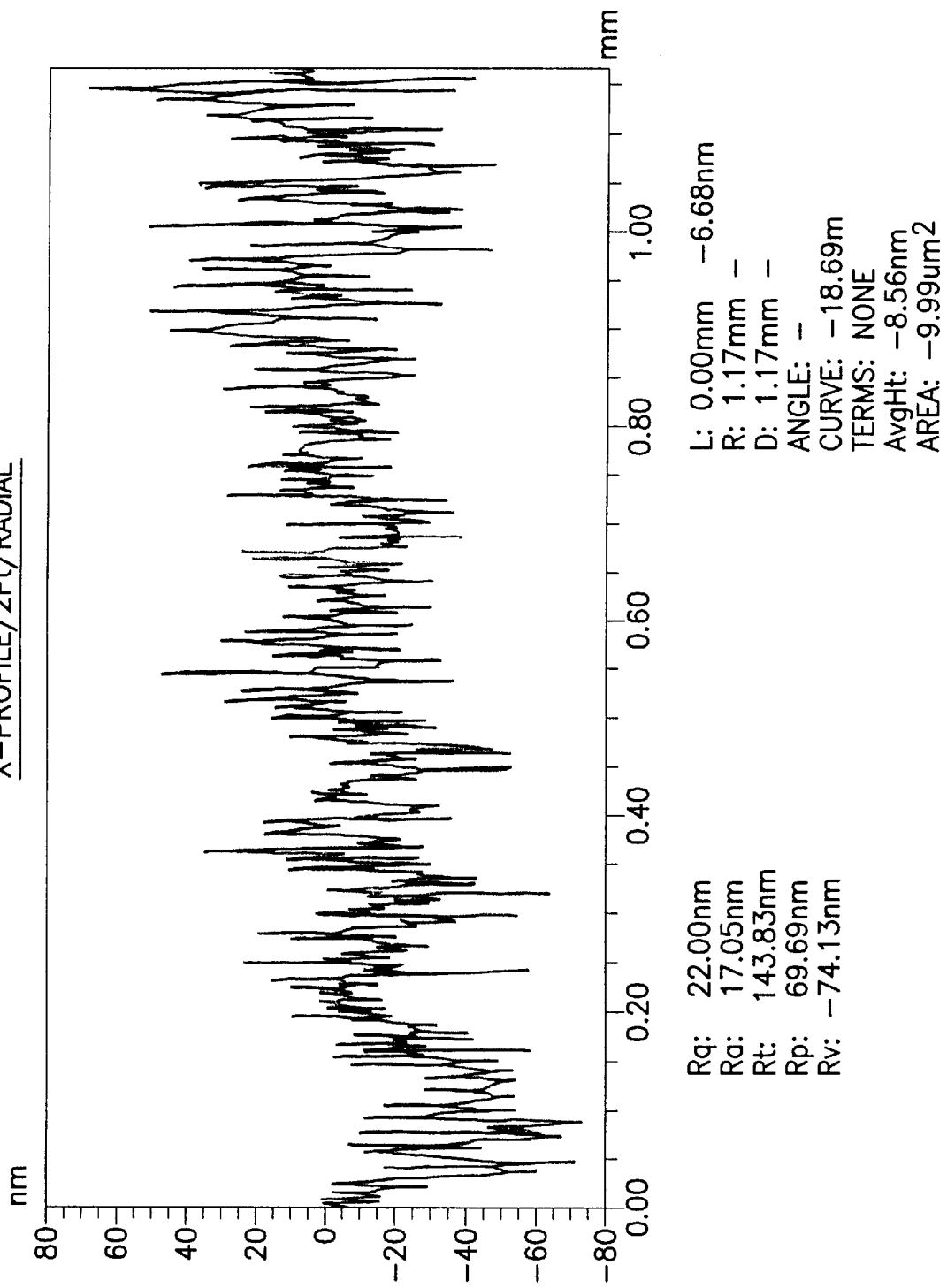
Figure 9C:
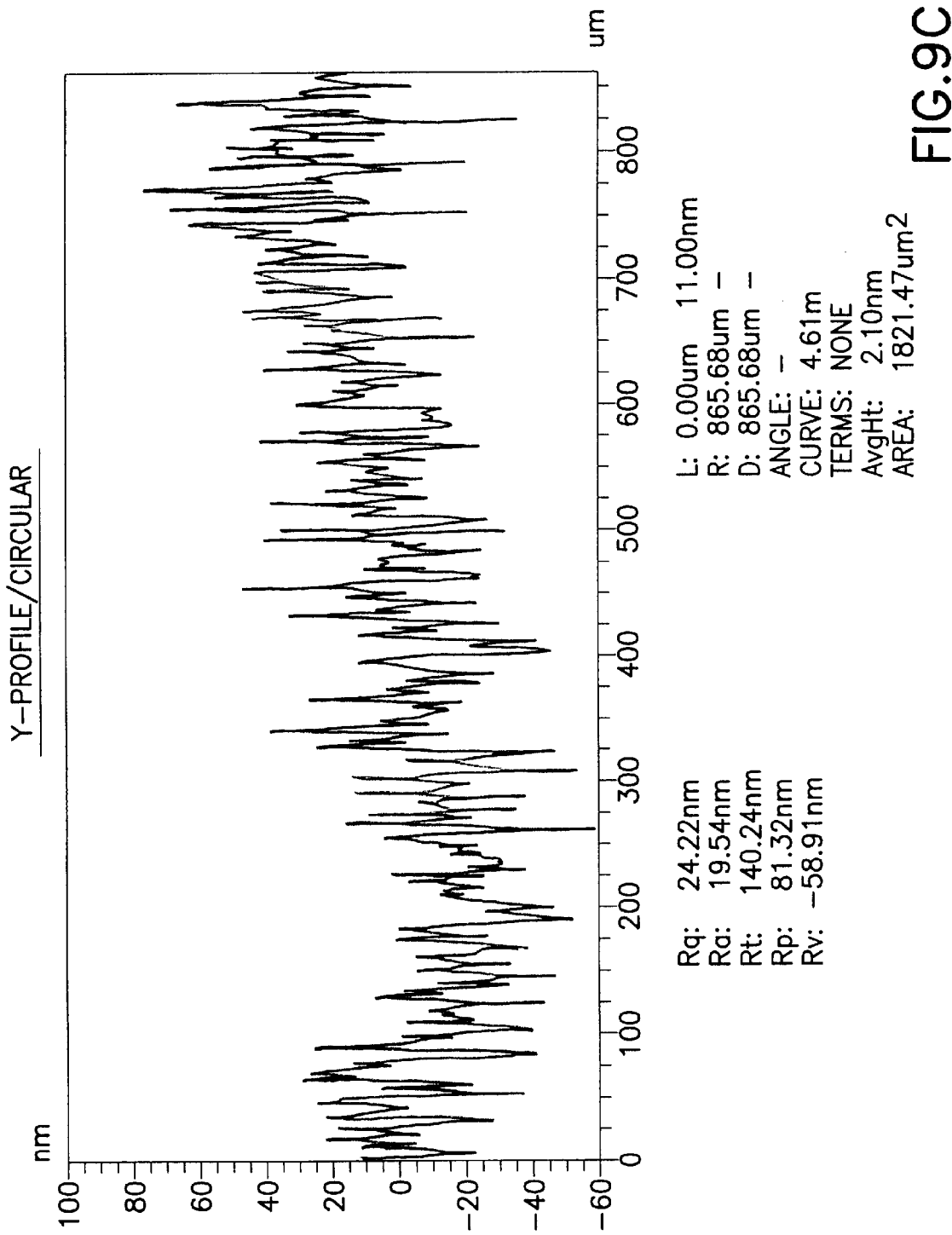

FIGS. 7, 8 and 9 show two dimensional topographic measurement reports of disks 20, the reports being generated using a WYKO Optical Interferometric Profiler. The measurement reports generated by the profiler show the topographic surface relief of a sample. The left hand side panel of each report shows a top-view map of the surface area of the sample. The topographical height in this map is represented by a greyscale image, where darker areas represent valleys and lighter areas represent peaks. The actual lateral dimensions of the scanned area are shown along the axes of the map. The map also contains cross hairs which denote the lines of cross-section of the relief. In the right hand side of each report, "X-Profile" and "Y-Profile" graphs show side-views of the cross-section by the horizontal and vertical cross hairs, respectively. These side view profiles provide quantitative information about the topography of the surface relief height, as well as lateral dimensions of the surface features.

FIGS. 7–9 were obtained for three different stages of processing of a disk. An initial stage, as shown in FIG. 7, is a virgin disk, in this case a DVD, as it comes out of a replication line. An intermediate stage, as shown in FIG. 8, is a disk or DVD with a rough, highly chemically resistant coating layer 201 applied, such as the three dimensional surface features 300 shown in FIG. 14B. At this stage the disk 20 is not readable. The report from this stage provides a specific example of topography that makes disks non-readable. The final stage, as shown in FIG. 9, is a disk 20 with a coating layer 200 applied on top of the rough coating layer 201. This coating layer 200 can include the color forming layer 302 as well as the barrier layer 304 shown in FIGS. 14C and 14D. At this point the surface of the disk 20 is sufficiently smooth again to return the disk 20 to a readable condition, and the smoothness is comparable to the initial state, shown in FIG. 7, which can be seen from the corresponding reports.

An attempt to tamper with the readout inhibiting mechanism, such as by removing the top, smoothing protective coating layer 200, thus results in exposure of the underlying rough coating layer 201, thereby rendering the disk 20 unreadable.

It was noted that the smoothing, protective coating layer 200 may include the color formation layer 302, as was described previously. In this case removing the color formation layer 302 results directly in exposure of the underlying textured (non-flat) surface of layer 201, thereby rendering the optical disk 20 unreadable.

Figure 10:
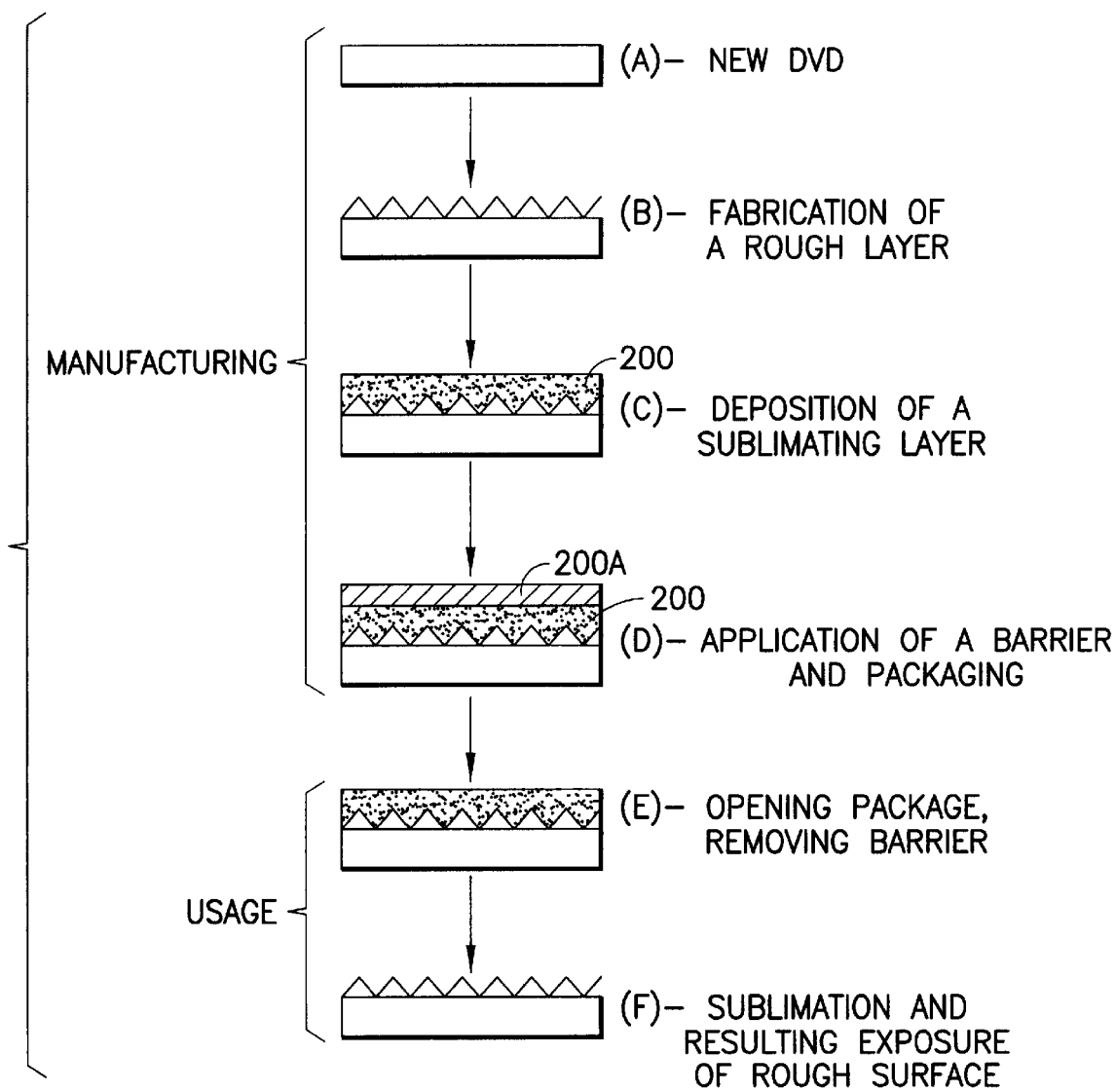
FIG. 10 depicts steps to apply a sublimation coating as a smoothing layer over a surface roughness layer in accordance with an aspect of these teachings.
Figure 11:
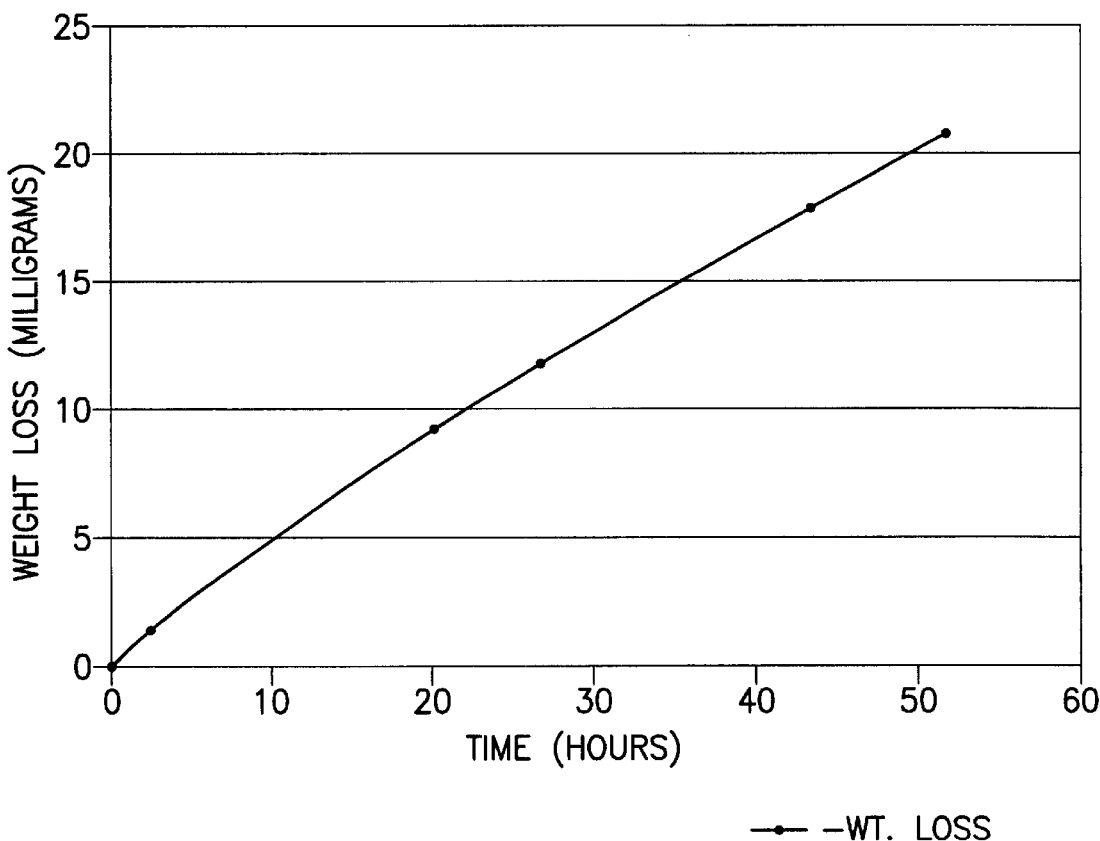
FIG. 11 is graph depicting weight loss as a function of time for a particular sublimation coating material (adamantane)

Further in accordance with these teachings, and referring to FIGS. 10 and 11, the sublimation of an index matching surface layer is used to expose an underlying textured or rough (non-flat) surface layer, rendering an optical disk 20 unreadable. At step B of FIG. 10 a surface texture is produced on the read-out side of a disk 20 by patterning the original disk material, such as is shown in FIG. 5 on path A. This can be accomplished by, as examples only, embossing, engraving, injection molding the disk 20 to have a texture, chemically or mechanically etching, or by simply scratching the original disk material.

Another method of producing a textured surface, as was described above in reference to FIG. 14, is by unevenly depositing or by spraying on a (preferably) chemically resistant, strongly adherent and optically transparent material on the original surface, as shown on path B of FIG. 5, making the disk unreadable. In this case, and by example, the surface could be made non-flat by placing droplets of the desired material on the disk surface, and allowing the droplets to dry or cure.

A next step C applies at least one sublimation coating 200 and, optionally, another coating 200A which permits the volatile compound of the sublimation coating 200 to pass through. The optional coating 200A may thus function as a protective coating, as well as a coating that controls the rate of sublimation and, thence, the playable lifetime of the disk 20. The result of applying the layer 200 is that a smooth, playable surface is provided for the optical disk 20, as the underlying non-flat surface has been planarized by the sublimation coating layer 200. Applying the (optional) protective barrier layer 200A is shown generally at step D, which also represents packaging the disk 20 in an airtight package containing a sufficient amount of the sublimating species to enable a two way transport. At step E it is assumed that the package is opened, thereby starting the playability period, and step F shows the result of the sublimation process after it has progressed to a point where the sublimating layer 200 is essentially totally removed. This exposes the underlying rough or textured surface of the disk 20, rendering the disk 20 unreadable. It should be noted that a sufficient degree of surface roughness may be achieved to prevent playability long before the entire sublimation (smoothing) layer has been lost to the surrounding medium, depending on the height and/or depth of the features provided on the non-flat surface of the disk 20.

In order to demonstrate that a colorless, transparent solid may sublime at a rate that would be useful for rendering an optical disk (e.g., a DVD) unreadable, adamantane (Mp.= 261–271 degrees C) was pressed into a round metal container with a surface area of 0.785 cm$^2$. In this way the sublimation would be from the surface of the adamantane only. The weight loss due to sublimation at room temperature was determined by weighing the container at various times and subtracting the weight obtained from the original weight. This data, and a graph of the data, is shown in FIG. 11.

It can be seen that the rate of sublimation is quite linear with time, and in this case had a value of 0.516 mg/hr/cm$^2$. Assuming this rate of sublimation it can be shown that a layer of adamantane would lose thickness at a rate of 0.48 microns per hour. In other words, a layer of adamantane that is five microns thick, coated over a textured (non-flat) surface of an optical disk 20, as described above, would sublime and expose the textured surface in about 10 hours, thereafter rendering the optical disk 20 unreadable.

In order to prevent a premature loss of material by evaporation or by sublimation into the free volume of the optical disk packaging material, a barrier (which could be opaque or substantially so) in the form of a peel-off sheet can be affixed to the read-out surface of the disk 20. The barrier is one that is impenetrable to the volatile component or components that are placed on the read-out surface of the disk 20 (e.g., such as the above mentioned adamantane in the sublimation embodiment or the above mentioned solvents in the evaporation embodiments). The volatile component(s) may be those used in the anti-tampering embodiments of this invention, or in the readable lifetime-limiting embodiments. In any event, the barrier in the form of the peel-off sheet serves to inhibit transport, such as by evaporation or sublimation, until removed prior to use of the disk 20 (FIG. 10, step D). Removal of the peel-off sheet (barrier layer) after opening the disk package serves to enable the disk 20 to be read, as well as initiating the limited play mechanism.

Figure 16:
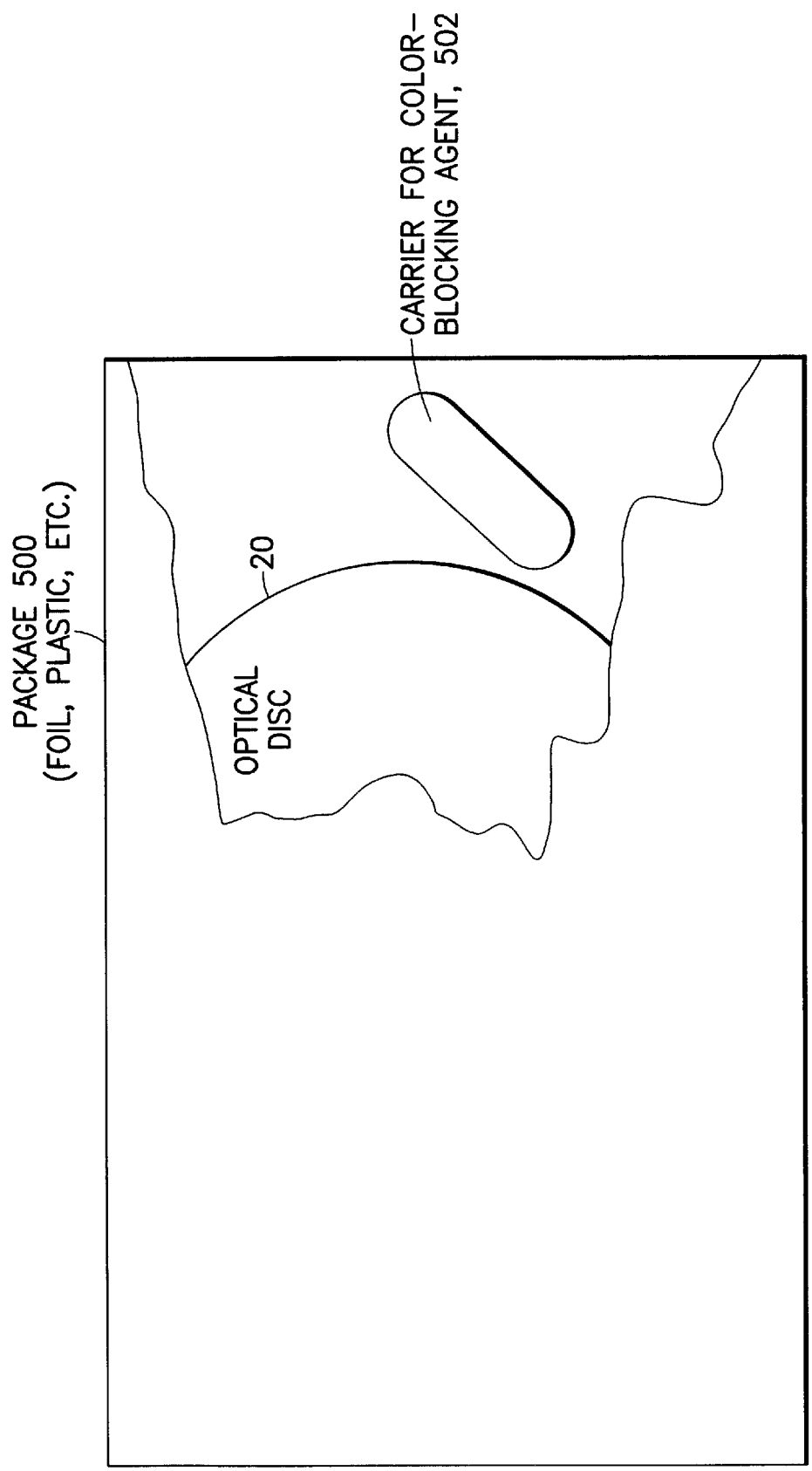
FIG. 16 is a partially cut-away view of a package containing a disk having a limited-play mechanism that contains a volatile compound, and a source of a color blocking agent (CBA).

FIG. 16 illustrates a sealed container or package 500, such as a foil or a plastic bag, that is suitable for practicing an aspect of the invention. The package 500 contains one or more of the disks 20 and a carrier or source 502 of a color blocking agent (CBA). The carrier 502 retains the CBA and gradually releases it into the package 500 in the gaseous state. The CBA is delivered to the disk 20 by means of diffusive transport, where it interacts with the disk 20 to maintain the disk in a machine-readable state. This process continues until equilibrium is achieved between the CBA gas and the disk 20, from which point the disk remains in a machine-readable state until the package 500 is opened.

The CBA may be a solid, a liquid or a gas. Examples or release mechanisms include evaporation, sublimation and diffusion through a membrane. The carrier 502 of the CBA can be implemented as a patch or swab of material with a developed surface (e.g., fibrous or porous), or a CBA-absorbing material, such as a polymer. The CBA release kinetics can be adjusted through various parameters of the carrier 502, such as size and position in the package 500 relative to the disk, and/or through porosity or permeability. For the evaporative embodiments, the CBA could be the same solvent that forms a part of the color forming coating layer 302 (FIG. 14), or for the sublimating embodiments the CBA could be the same sublimating compound.

Opening of the package 500 results in rapid loss of the CBA from the package, as well as depletion of the CBA carrier 502. The equilibrium between the CBA gas and the disk 20 is then permanently sifted towards decreasing CBA concentration, which corresponds to the onset of the limited-play time. As such, triggering of the limited-play mechanism coincides with the opening of the package 500.

In any of the foregoing embodiments it is within the scope of this invention to provide the further protective transparent coating (e.g., the barrier coating 304) to improve the robustness of the optical disk 20. For those embodiments that interact with the surrounding medium (e.g., those that sublime, or evaporate, or that absorb atmospheric water vapor, etc.), the protective layer is constructed so as not to prevent this action. As was described previously with reference to FIG. 15, the protective barrier layer could be employed to adjust the duration of the period during which the optical disk 20 remains readable, such as by limiting transport through the barrier layer 304 to some predetermined maximum rate. For example, the protective layer may be comprised of the UV-curable polymer that is applied by a spin-coating procedure and then UV-cured to harden it. The protective layer polymer material preferably comprises a silicone-based material. It may also comprise epoxy-based constituent(s). The protective coating layer, as well as the underlying index matching, non-flat surface smoothing layer and/or the color-change evaporation layer can be applied to the optical disk by a spraying technique, as well as by spinning-on, or by placing the disk 20 into an atmosphere that is saturated with the desired constituents, and letting the desired constituents condense onto the readout-surface of the disk 20.

In various embodiments of this invention the material that comprises the readout-inhibiting layer can include a lactone dye, such as crystal violet lactone, poly-p-(hydroxystyrene), ethanol, N-methyl pyrrolidinone and ammonia and formaldehyde, or the layer can comprise cellulose acetate butyrate, ethyl acetate, silica gel, and benzyl alcohol, or the layer can comprise a salt of a volatile amine, a non-volatile acid component and a lactone dye or a pH indicator dye, or the layer can comprise a water damp polymer film containing a pH indicator dye, wherein during storage the layer is exposed to an atmosphere of a gas whose water solution is one of acidic or basic, and wherein upon removal from storage a volatile gas evaporates from the water damp film, and the pH changes causing a color change in the pH indicator dye.

It can be appreciated that a number of embodiments of the teachings of this invention have been described herein, and it should be further appreciated that the teachings of this invention are not intended to be read in a limiting sense to encompass only these described embodiments.

Figure 12:
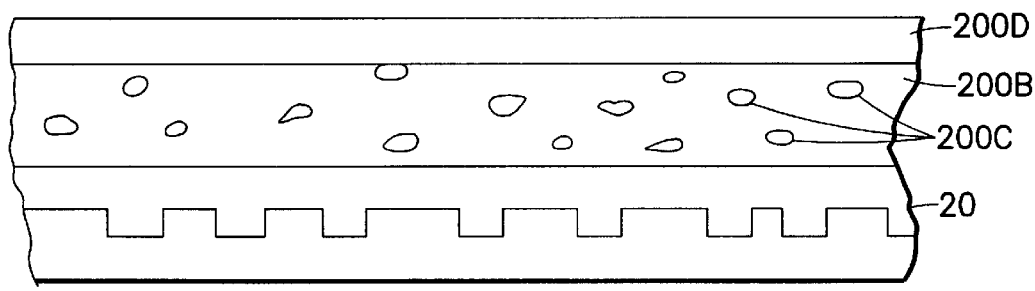
FIG. 12 is a cross-sectional view of an embodiment wherein a compound capable of evaporation or sublimation is incorporated as localized regions within a layer for producing light-scattering voids to inhibit readout of the optical disk in accordance with a further embodiment of these teachings.

For example, in a further embodiment of this invention one need not provide a substantially uniform coating or layer of a material capable of evaporation or sublimation on the readout-surface of the disk 20. In accordance with this example, and referring to FIG. 12, the surface of the disk 20 has applied thereto a transparent layer 200B that contains localized regions 200C of a volatile material. The regions 200C could be provided in any suitable way, such as by mixing or adding into the liquid phase of the transparent layer 200B, prior to spraying or spin-coating, small particles of the volatile material. A protective coating layer 200D can be applied over the layer 200B. In this embodiment of the invention the material of the layer 200B is assumed to be substantially index matched to the volatile material of the regions 200C, and the readout process proceeds in a normal fashion. However, after the material of the regions 200C partially or completely evaporates or sublimes, through the protective coating 200D if present, the resulting voids are no longer index matched or substantially index matched to the surrounding matrix of the transparent layer 200B. In this case the optical scattering increases due to the presence of the voids, and the readability of the disk 20 is degraded and compromised, which is the desired result, and need not significantly change the transmission of the layer. Preferably the readout beam profile is disturbed, and the optical noise is increased.

Polymer dispersed liquid crystal (PDLC) may be employed in a further embodiment, wherein the PDLC is poled and assumed to be in a bistable state. In this case thermal effects due to the readout laser beam are used to destabilize the oriented state of the PDLC, resulting in a the disk 20 becoming unreadable. It is also within the scope of these teachings to replace the liquid crystal material with a sublimating or evaporating agent.

Furthermore, in the multiple-wavelength embodiments that were disclosed above it is within the scope of these teachings to incorporate multiple chromophores for biasing the color forming coating for each of the wavelengths of interest. Further in this regard, the biasing chromophore(s) can be located in the color forming layer 302, and/or in the barrier layer 304, and/or in a third layer. Also, for the multiple-wavelength embodiment a single color forming coating 302 can be used, or multiple color forming coatings 302 can be applied, one for each wavelength of interest. Note that the multiple color forming coatings need not be placed one above another, but could instead be placed in the same plane at different locations on the readout surface of the disk 20.

Figure 13:
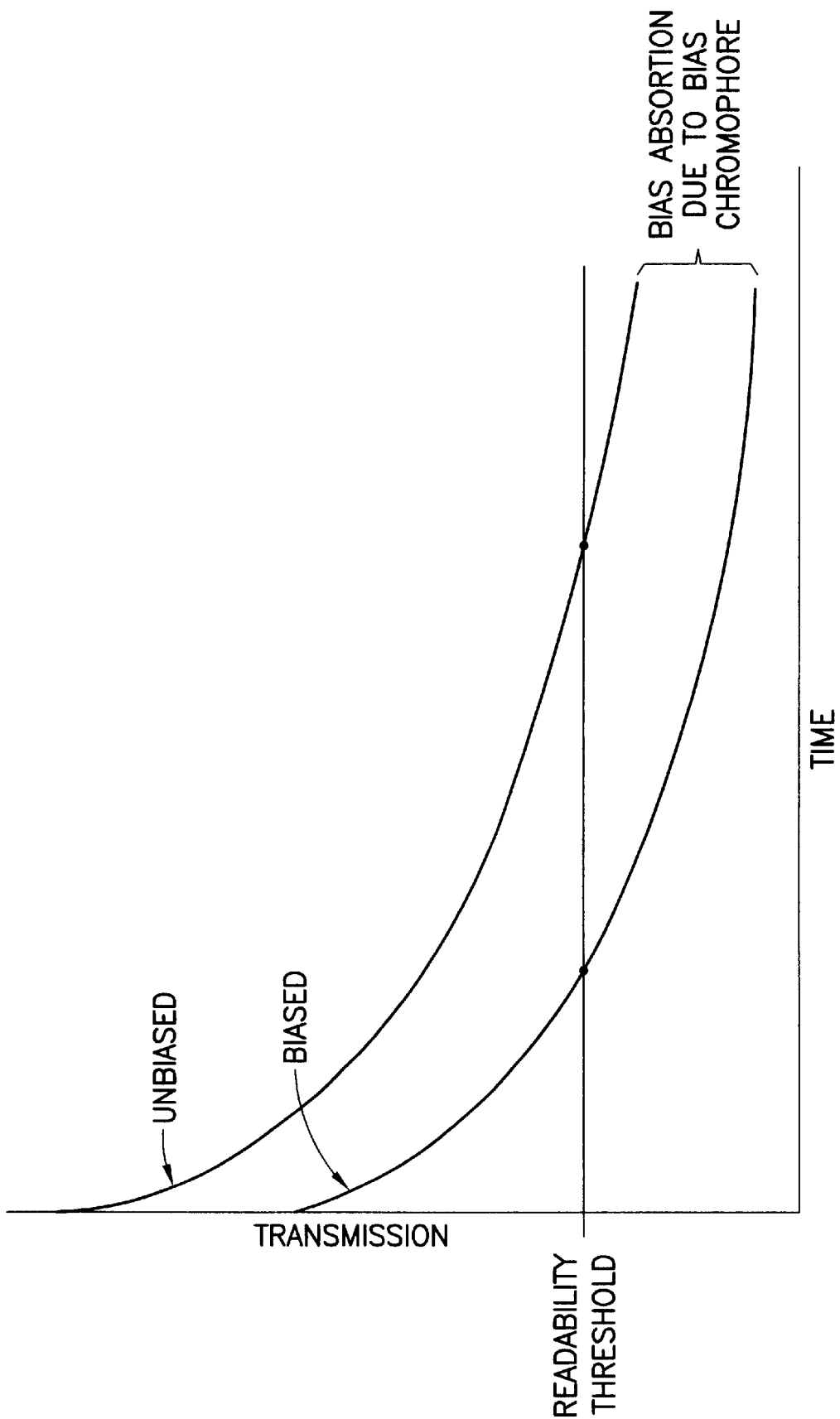
FIG. 13 is a graph that shows the use of a bias chromophore to vary a time required for a photoabsorbing layer in accordance with these teachings to reach a minimum disk readability threshold.

It can further be appreciated that as aspect of this invention is a method for setting a duration of the limited play period of the optical disk 20. Referring to FIGS. 13 and 15, the method includes steps of constructing the disk 20 to include at least one limited play region (302, 200) that contains a volatile compound, the limited play region operating by volatile compound transport that is driven by a concentration gradient between the region and a surrounding medium; and adjusting the duration of the limited play period by setting a thickness of the transport barrier layer (304, 200A) that overlies the region. The step of adjusting can include a further step of adding a bias chromophore in combination with the color forming layer 302 in the limited play region.

It should thus be apparent that various alternatives and modifications to the presently preferred embodiments of this invention may be devised by those skilled in the art without departing from the teachings of this invention. Accordingly, the teachings herein are intended to embrace all such alternatives, modifications and variances which fall within the scope of the claims.

What is claimed is:

1. A method for making an optically readable media unreadable, comprising steps of:

providing the media with a readout surface layer that is non-flat and that inhibits optical readout of the media;

applying a coating layer to the non-flat surface layer to smooth the non-flat surface and to enable optical readout of the media; and after an initiation of a readout period, reducing the thickness of the coating layer so as to expose the non-flat readout surface layer, thereby inhibiting optical readout of the media.

2. A method as in claim 1, wherein the coating layer is substantially index matched to the readout surface layer.

3. A method as in claim 1, wherein the step of reducing the thickness comprises a step of evaporating at least one component material of the coating layer.

4. A method as in claim 1, wherein the step of reducing the thickness comprises a step of subliming at least one component material of the coating layer.

5. A method for discouraging tampering with a readout-limiting mechanism of an optically readable media, comprising steps of:

provideing the media with at least one layer that embodies the readout-limiting mechanism;

providing a textured surface that comprises a layer that underlies said at least one layer, said textured surface inhibiting optical readout of the media; and applying a coating layer over said textured surface to smooth the textured surface and to enable optical readout of the media, wherein removal of the coating layer exposes the textured surface thereby inhibiting optical readout of the media;

wherein the readout-limiting mechanism comprises a layer that changes from a first state that enables successful readout of data structures located on the media to a second state that inhibits successful readout of data structures located on the media; and wherein said change to said second state is induced by an increase in optical absorption.

6. A method as in claim 5, wherein the readout-limiting mechanism layer changes from an optically transparent state to a state that inhibits successful readout of data structures located on the media.

7. A method as in claim 5, wherein the readout-limiting mechanism comprises said coating layer.

8. A method as in claim 2, wherein said coating layer changes from an optically transparent state to a state that inhibits successful readout of data structures located on the media.

9. A method as in claim 5, wherein said change to said second state is further induced by an increase in mechanical stress.

10. A method as in claim 5, wherein said change to said second state is further induced by an increase in at least one of optical noise and wavefront aberration created by scattering.

11. A method as in claim 5, wherein the coating layer is substantially index matched to the textured surface layer.

12. A method for discouraging tampering with a readout-limiting mechanism of an optically readable media, comprising steps of:

providing the media with at least one layer that embodies the readout-limiting mechanism;

providing a textured surface that comprises a layer that underlies said at least one layer, said textured surface inhibiting optical readout of the media; and applying a coating layer over said textured surface to smooth the textured surface and to enable optical readout of the media, wherein removal of the coating layer exposes the textured surface thereby inhibiting optical readout of the media;

wherein the readout-limiting mechanism comprises a layer that changes from a first state that enables successful readout of data structures located on the media to a second state that inhibits successful readout of data structures located on the media and, wherein said change to said second state is induced by evaporation of a volatile compound.

13. A method for discouraging tampering with a readout-limiting mechanism of an optically readable media, comprising steps of:

providing the media with at least one layer that embodies the readout-limiting mechanism;

providing a textured surface that comprises a layer that underlies said at least one layer, said textured surface inhibiting optical readout of the media; and applying a coating layer over said textured surface to smooth the textured surface and to enable optical readout of the media, wherein removal of the coating layer exposes the textured surface thereby inhibiting optical readout of the media;

wherein the readout-limiting mechanism comprises a layer that changes from a first state that enables successful readout of data structures located on the media to a second state that inhibits successful readout of data structures located on the media and, wherein said change to said second state is induced by sublimation of a volatile compound.

14. A method for making an optically readable media unreadable, comprising steps of:

providing the media with a first layer having a textured surface that would inhibit successful readout of the optically readable media;

coating the textured surface with a second layer that is comprised of a volatile component;

removing at least some of said volatile component for causing an increase in at least one of photoabsorption or scattering or surface roughness; wherein an attempt to remove the second layer results in exposure of the textured surface, thereby inhibiting successful readout of the optically readable media.

15. A method as in claim 14, wherein the step of removing at least some of the volatile component occurs through a barrier layer.

16. A method as in claim 14, wherein the step of removing at least some of the volatile component occurs after a step of removing a barrier layer.

17. A method as in claim 14, wherein the step of removing at least some of the volatile component occurs after a step of removing the media from a package that contains the volatile compound.

18. A method for making an optically readable media unreadable, comprising steps of:

providing the media with a first layer having a textured surface that would inhibit successful readout of the optically readable media;

coating the textured surface with a second layer that is comprised of a volatile component; and during a media play enablement period removing at least some of volatile component for reducing at least a thickness of the second layer; and terminating the media play enablement period when the thickness of the second layer is reduced to a point that an exposure of the textured surface occurs, thereby inhibiting successful readout of the optically readable media.

19. A method as in claim 18, wherein the step of removing at least some of the volatile component occurs through a barrier layer, and where the barrier layer has a thickness that is predetermined for controlling a rate of transport of the volatile component through the barrier layer.

20. A method as in claim 18, wherein the step of removing at least some of the volatile component occurs after a step of removing a barrier layer.

21. A method as in claim 18, wherein the step of removing at least some of the volatile component occurs after a step of removing the media from a package that contains the volatile compound.

22. An optically readable media, comprising:
a region that encodes information that is optically readable by a reading device;
an overlying readout surface layer that is non-flat and that would inhibit the readout device from reading the information; and
a coating layer over said non-flat surface layer for smoothing the non-flat surface and enabling the readout device to read the information; wherein
said coating layer is responsive to an initiation of a readout period for being reduced in thickness so as to expose at least a portion of the non-flat readout surface layer, thereby inhibiting the readout device from reading the information.

23. A media as in claim 22, wherein the coating layer is substantially index matched to the readout surface layer.

24. A media as in claim 22, wherein said coating layer is comprised of a volatile compound and is reduced in thickness by evaporation or sublimation of said volatile compound.

25. An optically readable media, comprising:
a region that encodes information that is optically readable by a reading device;
a transparent layer having a textured surface that overlies said region, said textured surface inhibiting optical readout of the media by the reading device; and
a readout-limiting layer that overlies said textured surface, said read-out limiting layer smoothing said textured surface and enabling, for the duration of a readout period, optical readout of the media by the readout device, wherein removal of the readout-limiting coating layer exposes said textured surface thereby inhibiting optical readout of the media by the readout device;
wherein the readout-limiting layer comprises material that changes from a first state that enables successful readout of data structures located on the surface regiori of the media to a second state that inhibits successful readout of the data structures located on the surface region of the media; and
wherein said change to said second state is induced by an increase in optical absorption.

26. A media as in claim 25, wherein the readout-limiting layer comprises material that changes from an optically transparent state to a state that inhibits successful readout of the surface region of the media.

27. A media as in claim 25, wherein said change to said second state is further induced by an increase in mechanical stress.

28. A media as in claim 25, wherein said change to said second state is further induced by an increase in optical scattering.

29. A media as in claim 25, wherein said readout-limiting layer is substantially index matched to said transparent layer.

30. An optically readable media, comprising:
a region that encodes information that is optically readable by a reading device;
a transparent layer having a textured surface that overlies said region, said textured surface inhibiting optical readout of the media by the reading device; and
a readout-limiting layer that overlies said textured surface, said read-out limiting layer smoothing said textured surface and enabling, for the duration of a readout period, optical readout of the media by the readout device, wherein removal of the readout-limiting coating layer exposes said textured surface thereby inhibiting optical readout of the media by the readout device;
wherein the readout-limiting layer comprises material that changes from a first state that enables successful readout of data structures located on the surface region of the media to a second state that inhibits successful readout of the data structures located on the surface region of the media and,
wherein said change to said second state is induced by evaporation or sublimation of a volatile compound.

31. An optically readable media, comprising:
a region that encodes information that is optically readable by a reading device;
a transparent layer having a textured surface that overlies said region, said textured surface inhibiting optical readout of the media by the reading device; and
a readout-limiting layer that overlies said textured surface, said read-out limiting layer smoothing said textured surface and enabling, for the duration of a readout period, optical readout of the media by the readout device, wherein removal of the readout-limiting coating layer exposes said textured surface thereby inhibiting optical readout of the media by the readout device, wherein at least one layer is comprised of a volatile substance, and further comprising a barrier layer for isolating said at least one layer from a surrounding medium.

32. An optically readable media, comprising:
a region that encodes information that is optically readable by a reading device;
a transparent layer having a textured surface that overlies said region, said textured surface inhibiting optical readout of the media by the reading device; and
a readout-limiting layer that overlies said textured surface, said read-out limiting layer smoothing said textured surface and enabling, for the duration of a readout period, optical readout of the media by the readout device, wherein removal of the readout-limiting coating layer exposes said textured surface thereby inhibiting optical readout of the media by the readout device, wherein at least one layer is comprised of a volatile substance, and further comprising a peel-off barrier layer for isolating said at least one layer from a surrounding medium at least until it is desired to use the media in the readout device.

33. An optically readable disk, comprising:
a readout surface through which a readout device is able to read information;
a plurality of three dimensional features disposed on said readout surface, said features inhibiting optical readout of said disk by the reading device;
a color forming layer disposed over said readout surface and at least partially covering said features; and
an outer layer disposed over said color forming layer, wherein said features are completely covered by said color forming layer and said outer layer, and wherein the presence of said color forming layer and said outer layer enables optical readout of said disk by the reading device.

34. An optically readable disk as in claim 33, wherein said color forming layer comprises a volatile compound that enters a surrounding medium via a transport mechanism driven by a concentration gradient between said color forming layer and the surrounding medium.

35. An optically readable disk as in claim 34, wherein a thickness of said outer layer is selected at least in part on a desired amount of time that said disk is to remain in a readable condition after the initiation of said transport mechanism.

36. An optically readable disk as in claim 34, wherein said disk is sealed in a container with a source of said volatile compound.

37. An optically readable disk as in claim 34, wherein said disk further comprises a peel-off barrier layer to prevent transport of said volatile compound through said outer layer.

38. An optically readable disk as in claim 33, wherein said disk comprises an optically detectable taggant compound.

39. An optically readable disk as in claim 33, wherein said color forming layer exhibits an absorption maximum corresponding to one readout wavelength.

40. An optically readable disk as in claim 33, wherein said color forming layer exhibits a plurality of absorption maximum corresponding to a plurality of readout wavelengths.

41. An optically readable disk as in claim 33, wherein removal of all or a portion of a thickness of said color forming layer exposes at least some of said three dimensional features for subsequently inhibiting optical readout of the disk by the reading device.

42. An optically readable disk as in claim 33, wherein said color forming layer comprises at least one chromophore that bias said color forming layer so as to reduce an amount of time required for said color forming layer to transition from a state where said disk is readable to a state where said disk in unreadable.

43. A method of fabricating a limited play optically readable disk, comprising steps of:

providing a disk having a readout surface through which a readout device is able to read information;

forming a plurality of three dimensional features at said readout surface, said features inhibiting optical readout of said disk by the reading device;

forming a color forming layer disposed over said readout surface and at least partially covering said features; and forming an outer layer disposed over said color forming layer, wherein said features are completely covered by said color forming layer and said outer layer, and wherein the presence of said color forming layer and said outer layer enables optical readout of said disk by the reading device.

44. A method for setting a duration of a limited play period of an optically readable disk, comprising steps of:

constructing the disk to include at least one limited play region comprised of a volatile compound, the limited play region operating by volatile compound transport driven by a concentration gradient between the region and a surrounding medium; and adjusting the duration of the limited play period by setting a thickness of a transport barrier layer that overlies the region;

the step of adjusting comprising a further step of adding a bias chromophore in combination with a color forming layer in the limited play region.

45. A method as in claim 44, where said bias chromophore is selected to absorb light at a desired wavelength for causing the color forming layer to exhibit some amount of absorption that is less than a maximum amount of absorption that is tolerated by a readout device before the optically readable disk becomes unreadable.

46. A method as in claim 44, where said bias chromophore is selected to absorb light at a desired wavelength for causing transmission of light through the color forming layer to not asymptotically approach a readability threshold.

47. A method as in claims 44, where said bias chromophore is selected, for use with a readout device that employs about a 650 nm readout wavelength, to comprise 3-Diethylamino-7-diethyliminophenoxazonium perchlorate.

* * * * *